US008655015B2

(12) United States Patent
Nishimoto et al.

(10) Patent No.: US 8,655,015 B2
(45) Date of Patent: Feb. 18, 2014

(54) IMAGE GENERATION SYSTEM, IMAGE GENERATION METHOD, AND INFORMATION STORAGE MEDIUM

(75) Inventors: Yasuhiro Nishimoto, Yokohama (JP); Chihiro Kozasa, Yokohama (JP); Tadashi Sakakibara, Tokyo (JP); Daisuke Sekioka, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 132 days.

(21) Appl. No.: 13/158,003

(22) Filed: Jun. 10, 2011

(65) Prior Publication Data

US 2011/0306422 A1    Dec. 15, 2011

(30) Foreign Application Priority Data

Jun. 11, 2010   (JP) ................................. 2010-134583

(51) Int. Cl.
*G06K 9/00*      (2006.01)

(52) U.S. Cl.
USPC ......................................................... 382/103

(58) Field of Classification Search
None
See application file for complete search history.

(56) References Cited

U.S. PATENT DOCUMENTS

| 2002/0019258 | A1  | 2/2002  | Kim et al. | |
|---|---|---|---|---|
| 2007/0285419 | A1* | 12/2007 | Givon | 345/420 |
| 2009/0069096 | A1* | 3/2009  | Nishimoto | 463/43 |
| 2010/0245365 | A1* | 9/2010  | Hato et al. | 345/473 |
| 2010/0303289 | A1* | 12/2010 | Polzin et al. | 382/103 |

FOREIGN PATENT DOCUMENTS

JP   A-2008-136695   6/2008

OTHER PUBLICATIONS

Multon, Frank et al., "MKM: A Global Framework for Animating Humans in Virtual Reality Applications," Presence, Feb. 2008, vol. 17, No. 1, pp. 17-28.
Dariush, Behzad et al., "Online and Markerless Motion Retargeting with Kinematic Constraints," Proceedings of International Conference on Intelligent Robots and Systems, Sep. 2008, pp. 191-198.
Extended European Search Report issued in European Patent Application No. 11169647.2 dated Oct. 13, 2011.
U.S. Appl. No. 13/158,000, filed Jun. 10, 2011 in the name of Yasuhiro Nishimoto et al.
U.S. Appl. No. 13/157,986, filed Jun. 10, 2011 in the name of Yasuhiro Nishimoto et al.
U.S. Appl. No. 13/157,953, filed Jun. 10, 2011 in the name of Yasuhiro Nishimoto et al.

* cited by examiner

*Primary Examiner* — Stephen R Koziol
*Assistant Examiner* — Delomia Gilliard
(74) *Attorney, Agent, or Firm* — Oliff PLC

(57) ABSTRACT

An image generation system includes an image information acquisition section that acquires image information from an image sensor, a skeleton information acquisition section that acquires skeleton information based on the image information from the image sensor, the skeleton information specifying a motion of an operator viewed from the image sensor, a correction section that performs a correction process on position information about a bone of a skeleton indicated by the skeleton information, and an image generation section that generates an image based on a result of the correction process.

16 Claims, 21 Drawing Sheets

COLOR IMAGE INFORMATION

DEPTH INFORMATION

DEPTH INFORMATION

SKELETON INFORMATION

IMAGE SENSOR

DISPLAY SECTION

IMAGE SENSOR

DISPLAY SECTION

FIG. 14A

SKELETON INFORMATION

| BONE (JOINT) | POSITION INFORMATION |
|---|---|
| C0(WAIST) | XC0, YC0, ZC0 |
| C1(CHEST) | XC1, YC1, ZC1 |
| C2(NECK) | XC2, YC2, ZC2 |
| ⋮ | ⋮ |

FIG. 14B

RELIABILITY INFORMATION

| BONE (JOINT) | RELIABILITY |
|---|---|
| C0 | DC0 |
| C1 | DC1 |
| C2 | DC2 |
| ⋮ | ⋮ |

RELIABILITY IS HIGH

RELIABILITY IS LOW

RELIABILITY IS HIGH

RELIABILITY IS LOW

IMAGE GENERATION SYSTEM, IMAGE GENERATION METHOD, AND INFORMATION STORAGE MEDIUM

Japanese Patent Application No. 2010-134583 filed on Jun. 11, 2010, is hereby incorporated by reference in its entirety.

BACKGROUND

The present invention relates to an image generation system, an image generation method, an information storage medium, and the like.

A game device that allows the player to perform a game operation using a controller provided with a motion sensor instead of a controller provided with an operation button and a direction key, has been popular. A game device having such an operation interface allows the operator (player or user) to perform an intuitive operation input, and can simplify the game operation, for example. JP-A-2008-136695 discloses a game device that enables such an intuitive interface, for example.

Such an intuitive interface may also be implemented by capturing the operator using an image sensor, and implementing an operation input based on the motion of the operator.

However, since the operators differ in height, age, and the like, it may be difficult to appropriately recognize an operation input performed by each operator.

SUMMARY

According to one aspect of the invention, there is provided an image generation system comprising:

an image information acquisition section that acquires image information from an image sensor;

a skeleton information acquisition section that acquires skeleton information based on the image information from the image sensor, the skeleton information specifying a motion of an operator viewed from the image sensor;

a correction section that performs a correction process on position information about a bone of a skeleton indicated by the skeleton information; and an image generation section that generates an image corresponding to a result of the correction process.

According to another aspect of the invention, there is provided an image generation system comprising:

an image information acquisition section that acquires image information from an image sensor;

a skeleton information acquisition section that acquires skeleton information based on the image information from the image sensor, the skeleton information specifying a motion of an operator viewed from the image sensor;

an object control section that controls an object of a character that moves or makes a motion based on a motion of the operator based on the skeleton information;

a correction section that performs a correction process that changes a size of the character by a scaling factor based on a positional relationship between the character and a contact target object that is a contact target of the character; and an image generation section that generates an image corresponding to a result of the correction process.

According to another aspect of the invention, there is provided an image generation method comprising:

acquiring image information from an image sensor;

acquiring skeleton information based on the image information from the image sensor, the skeleton information specifying a motion of an operator viewed from the image sensor;

performing a correction process on position information about a bone of a skeleton indicated by the skeleton information; and generating an image corresponding to a result of the correction process.

According to another aspect of the invention, there is provided an image generation method comprising:

acquiring image information from an image sensor;

acquiring skeleton information based on the image information from the image sensor, the skeleton information specifying a motion of an operator viewed from the image sensor;

controlling an object of a character that moves or makes a motion based on a motion of the operator based on the skeleton information;

performing a correction process that changes a size of the character by a scaling factor based on a positional relationship between the character and a contact target object that is a contact target of the character; and generating an image corresponding to a result of the correction process.

According to another aspect of the invention, there is provided a computer-readable information storage medium storing a program that causes a computer to execute the above image generation method.

BRIEF DESCRIPTION OF THE DRAWINGS

FIG. 3 is a view illustrative of a method that calculates skeleton information about an operator based on depth information and the like.

FIGS. 14A and 14B are views illustrative of an example of the data structure of skeleton information and reliability information.

DESCRIPTION OF EXEMPLARY EMBODIMENTS

Figure 1:
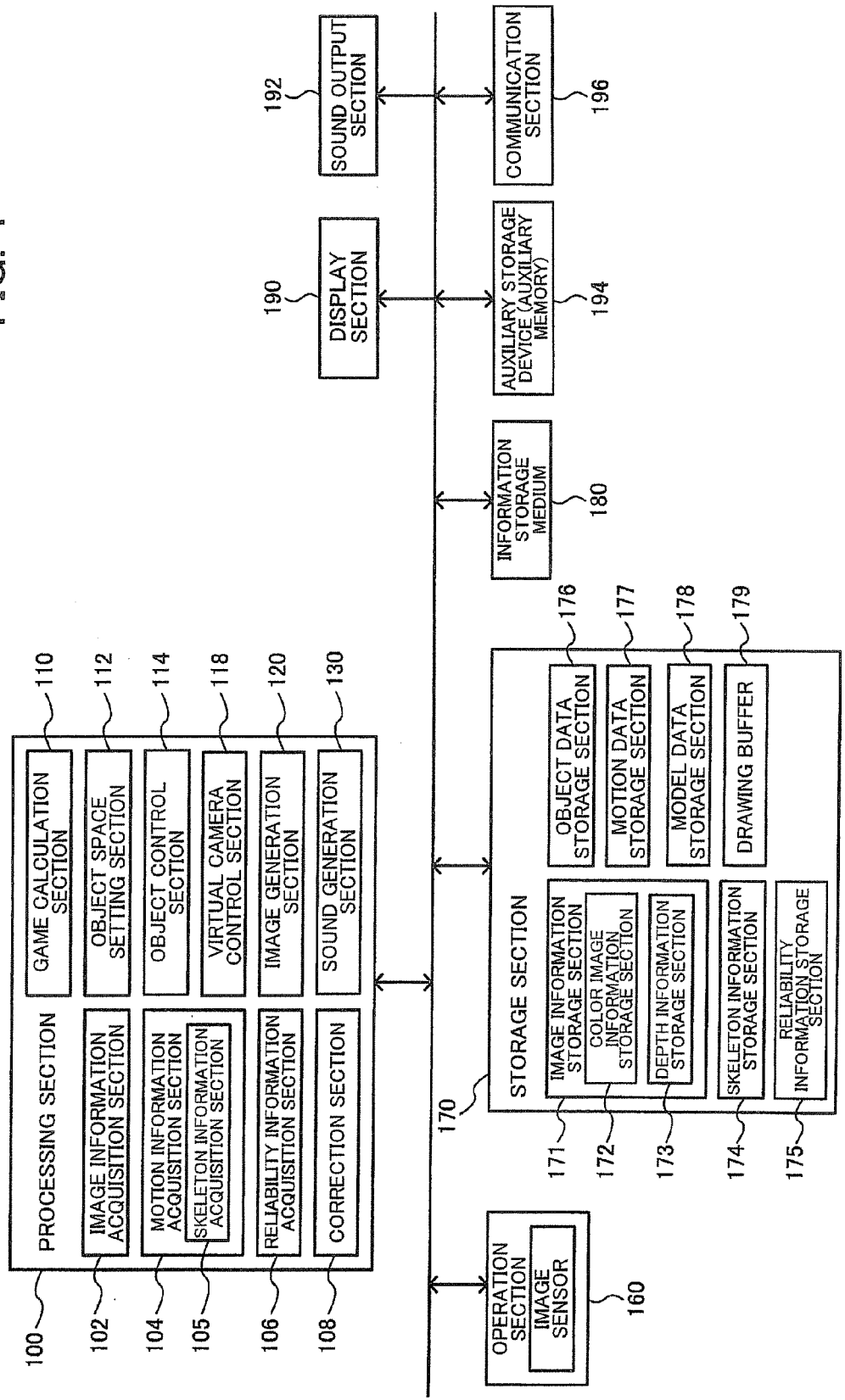
FIG. 1 shows a configuration example of an image generation system according to one embodiment of the invention.

Several aspects of the invention may provide an image generation system, an image generation method, an information storage medium, and the like that can generate various images using skeleton information about the operator.

According to one embodiment of the invention, there is provided an image generation system comprising:

an image information acquisition section that acquires image information from an image sensor;

a skeleton information acquisition section that acquires skeleton information based on the image information from the image sensor, the skeleton information specifying a motion of an operator viewed from the image sensor;

a correction section that performs a correction process on position information about a bone of a skeleton indicated by the skeleton information; and an image generation section that generates an image corresponding to a result of the correction process.

According to one embodiment of the invention, the image information is acquired from the image sensor, and the skeleton information about the operator is acquired based on the image information. The correction process is performed on the position information about the bone of the skeleton indicated by the skeleton information, and an image based on the result of the correction process is generated. This makes it possible to generate various images by utilizing the skeleton information about the operator. For example, it is possible to deal with various operators who differ in physique or the like.

The image generation system may further comprise:

an object control section that controls an object that moves or makes a motion based on a motion of the operator, the object control section may control the object based on the result of the correction process.

This makes it possible to implement object control that reflects the result of the correction process performed on the position information about the bone of the skeleton.

In the image generation system, the correction section may perform the correction process on the position information about the bone of the skeleton to obtain corrected position information;

the object control section may control the object based on the corrected position information; and the image generation section may generate an image so that the object is displayed at a display position on a screen corresponding to the corrected position information.

This makes it possible to perform the correction process on the position information about the bone of the skeleton, and display the object at a display position corresponding to the corrected position information.

In the image generation system, the object may be an object that moves based on a motion of a given part of the operator.

This makes it possible to move the object based on the motion of the given part of the operator, and reflect the result of the correction process in control of the movement of the object, for example.

In the image generation system, the given part may be a hand of the operator, and the object may be a hand object that moves based on a motion of the hand of the operator.

This makes it possible to move the hand object based on the motion of the hand of the operator, and reflect the result of the correction process in control of the movement of the hand object, for example.

In the image generation system, the object control section may control the object using the result of the correction process in a first mode, and may control the object using the skeleton information in a second mode without using the result of the correction process.

It is possible to efficiently implement appropriate object control based on the type of game and the like by providing the first mode and the second mode.

In the image generation system, the correction section may perform the correction process so that a display position of the object when a skeleton of a first operator is in a first state is identical with a display position of the object when a skeleton of a second operator is in the first state.

This makes it possible to control the object irrespective of whether the operator is the first operator or the second operator.

In the image generation system, the correction section may perform the correction process using physique information about the operator.

This makes it possible to reflect the physique information about the operator in the correction process. Therefore, a correction process that absorbs the difference in physique or the like between the operators can be implemented.

In the image generation system, the correction section may perform the correction process using joint-to-joint distance information about a distance between a first joint and a second joint of the skeleton as the physique information.

This makes it possible to acquire the joint-to-joint distance information from the skeleton information as the physique information, and implement a correction process that absorbs the difference in physique or the like between the operators.

In the image generation system, the correction section may perform the correction process using distance information as the physique information, the distance information being obtained from the joint-to-joint distance information acquired over a plurality of frames.

This makes it possible to implement an appropriate correction process even when peculiar joint-to-joint distance information is obtained.

In the image generation system, the correction section may determine an angle formed by a first direction that connects a position of the operator with the image sensor and a second direction that connects the position of the operator with a position of a joint corresponding to a given part of the operator, and then may perform the correction process.

This makes it possible to implement a correction process that absorbs the difference in physique or like between the operators.

The image generation system may further comprise:

a game calculation section that performs a game calculation process, the game calculation section may perform the game calculation process corresponding to the result of the correction process.

This makes it possible to implement a game calculation process that reflects the result of the correction process performed on the position information about the bone of the skeleton.

In the image generation system, the game calculation section may perform a game result calculation process corresponding to the result of the correction process as the game calculation process.

This makes it possible to reflect the correction process performed on the position information about the bone of the skeleton in the game result calculation process.

In the image generation system, the correction section may perform the correction process on moving amount information about a position of the bone of the skeleton to obtain corrected moving amount information; and the game calculation section may perform the game result calculation process based on the corrected moving amount information.

This makes it possible to correct the moving amount information about the position of the bone of the skeleton, and implement a game result calculation process that utilizes the resulting corrected moving amount information.

The image generation system may further comprise:

an object control section that controls an object of a character that moves or makes a motion based on a motion of the operator, the correction section may perform the correction process that changes a size of the character by a scaling factor based on a positional relationship between the character and a contact target object that is a contact target of the character.

According to the above feature, the size of the character is changed based on the positional relationship between the character and the contact target object. This makes it possible to implement an appropriate contact event between the character and the contact target object.

In the image generation system, the correction section may perform the correction process that adjusts a placement position of the character based on the positional relationship between the contact target object and the character.

According to the above feature, the placement position of the character is adjusted based on the positional relationship between the character and the contact target object. This makes it possible to implement an appropriate contact event between the character and the contact target object.

The image generation system may further comprise:

a reliability information acquisition section that acquires reliability information that indicates reliability of the skeleton information, the image generation section may generate an image corresponding to the acquired reliability information as the image displayed on the display section.

This makes it possible to reflect the reliability of the skeleton information in the image displayed on the display section. Therefore, a novel image generation system can be provided.

In the image generation system, the image generation section may change a display state of the image displayed on the display section based on the reliability information.

According to the above feature, since the display state of the image displayed on the display section changes when the reliability indicated by the reliability information has increased or decreased, it is possible to notify the operator of an increase or a decrease in reliability through a change in display state of the image.

According to another embodiment of the invention, there is provided an image generation system comprising:

an image information acquisition section that acquires image information from an image sensor;

a skeleton information acquisition section that acquires skeleton information based on the image information from the image sensor, the skeleton information specifying a motion of an operator viewed from the image sensor;

an object control section that controls an object of a character that moves or makes a motion based on a motion of the operator based on the skeleton information;

a correction section that performs a correction process that changes a size of the character by a scaling factor based on a positional relationship between the character and a contact target object that is a contact target of the character; and an image generation section that generates an image corresponding to a result of the correction process.

According to another embodiment of the invention, there is provided an image generation method comprising:

acquiring image information from an image sensor;

acquiring skeleton information based on the image information from the image sensor, the skeleton information specifying a motion of an operator viewed from the image sensor;

performing a correction process on position information about a bone of a skeleton indicated by the skeleton information; and generating an image corresponding to a result of the correction process.

According to another embodiment of the invention, there is provided an image generation method comprising:

acquiring image information from an image sensor;

acquiring skeleton information based on the image information from the image sensor, the skeleton information specifying a motion of an operator viewed from the image sensor;

controlling an object of a character that moves or makes a motion based on a motion of the operator based on the skeleton information;

performing a correction process that changes a size of the character by a scaling factor based on a positional relationship between the character and a contact target object that is a contact target of the character; and generating an image corresponding to a result of the correction process.

According to another embodiment of the invention, there is provided a computer-readable information storage medium storing a program that causes a computer to execute the above image generation method.

Exemplary embodiments of the invention are described below. Note that the following exemplary embodiments do not in any way limit the scope of the invention laid out in the claims. Note that all elements of the following embodiments should not necessarily be taken as essential requirements for the invention.

1. Configuration

FIG. 1 shows an example of a block diagram of an image generation system (game device or visual instrument) according to one embodiment of the invention. Note that the image generation system according to one embodiment of the invention is not limited to the configuration shown in FIG. 1. Various modifications may be made, such as omitting some of the elements (sections) or adding other elements (sections).

An operation section 160 allows the operator to input operation information. The operation section 160 includes an image sensor that is implemented by a color image sensor, a depth sensor, or the like. The function of the operation section 160 may be implemented by only the image sensor, or may be implemented by the image sensor and an operation device (e.g., direction key, an operation button, an analog stick, a lever, a sensor (e.g., angular velocity sensor or acceleration sensor), a microphone, or a touch panel display) other than the image sensor.

A storage section 170 serves as a work area for a processing section 100, a communication section 196, and the like. The function of the storage section 170 may be implemented by a RAM (DRAM or VRAM) or the like. A game program and game data that is necessary when executing the game program are stored in the storage section 170.

An information storage medium 180 (computer-readable medium) stores a program, data, and the like. The function of the information storage medium 180 may be implemented by an optical disk (DVD), a hard disk drive (HDD), a memory (e.g., ROM), or the like. The processing section 100 performs various processes according to one embodiment of the invention based on a program (data) stored in the information storage medium 180. Specifically, a program that causes a computer (i.e., a device including an operation section, a processing section, a storage section, and an output section) to function as each section according to one embodiment of the invention (i.e., a program that causes a computer to execute the process of each section) is stored in the information storage medium 180.

A display section 190 outputs an image generated according to one embodiment of the invention. The function of the display section 190 may be implemented by an LCD, an organic EL display, a CRT, a touch panel display, a head mount display (HMD), or the like. A sound output section 192 outputs sound generated according to one embodiment of the invention. The function of the sound output section 192 may be implemented by a speaker, a headphone, or the like.

An auxiliary storage device 194 (auxiliary memory or secondary memory) is a storage device used to supplement the capacity of the storage section 170. The auxiliary storage device 194 may be implemented by a memory card such as an SD memory card or a multimedia card, or the like.

The communication section 196 communicates with the outside (e.g., another image generation system, a server, or a host device) via a cable or wireless network. The function of the communication section 196 may be implemented by hardware such as a communication ASIC or a communication processor, or communication firmware.

A program (data) that causes a computer to function as each section according to one embodiment of the invention may be distributed to the information storage medium 180 (or the storage section 170 or the auxiliary storage device 194) from an information storage medium included in a server (host device) via a network and the communication section 196. Use of the information storage medium included in the server (host device) is also intended to be included within the scope of the invention.

The processing section 100 (processor) performs a game process, an image generation process, a sound generation process, and the like based on the operation information from the operation section 160, a program, and the like. The processing section 100 performs various processes using the storage section 170 as a work area. The function of the processing section 100 may be implemented by hardware such as a processor (e.g., CPU or GPU) or an ASIC (e.g., gate array), or a program.

The processing section 100 includes an image information acquisition section 102, a motion information acquisition section 104, a reliability information acquisition section 106, a correction section 108, a game calculation section 110, an object space setting section 112, an object control section 114, a virtual camera control section 118, an image generation section 120, and a sound generation section 130. Note that various modifications may be made, such as omitting some of these elements or adding other elements.

The image information acquisition section 102 acquires image information from the image sensor. For example, information about an image captured by the image sensor is stored in an image information storage section 171 included in the storage section 170. Specifically, information about a color image captured by the color image sensor of the image sensor is stored in a color image information storage section 172, and information about a depth image captured by the depth sensor of the image sensor is stored in a depth information storage section 173. The image information acquisition section 102 reads (acquires) the image information from the image information storage section 171.

The motion information acquisition section 104 acquires motion information about the operator. A skeleton information acquisition section 105 included in the motion information acquisition section 104 acquires skeleton information, and the reliability information acquisition section 106 acquires reliability information about the skeleton information. The skeleton information is stored in a skeleton information storage section 174, and the reliability information is stored in a reliability information storage section 175. The correction section 108 performs various correction processes. The details of the motion information acquisition section 104, the skeleton information acquisition section 105, the reliability information acquisition section 106, and the correction section 108 are described later.

The game calculation section 110 performs a game calculation process. The game calculation process includes starting the game when game start conditions have been satisfied, proceeding with the game, calculating the game results, and finishing the game when game finish conditions have been satisfied, for example.

The object space setting section 112 sets an object space where a plurality of objects are disposed. For example, the object space setting section 112 disposes an object (i.e., an object formed by a primitive surface such as a polygon, a free-form surface, or a subdivision surface) that represents a display object such as a character (e.g., human, animal, robot, car, ship, or airplane), a map (topography), a building, a course (road), a tree, or a wall in the object space. When the object is a three-dimensional object, the object space setting section 112 determines the position and the rotation angle (synonymous with orientation or direction) of the object in a world coordinate system, and disposes the object at the determined position (X, Y, Z) and the determined rotation angle (rotation angles around X, Y, and Z axes). More specifically, an object data storage section 176 of the storage section 170 stores an object number, and object data (e.g., the position, rotation angle, moving speed, and moving direction of the object (part object)) that is linked to the object number. The object space setting section 112 updates the object data every frame, for example.

The object control section 114 controls the object. For example, the object control section 114 controls at least one of the movement and the motion of the object based on the operation information input by the player using the operation section 160, a program (movement/motion algorithm), various types of data, and the like. More specifically, the object control section 114 performs a simulation process that sequentially calculates movement information (position, rotation angle, speed, or acceleration) about the object every frame (e.g., 1/60th of a second). The object control section 114 also performs a motion process, an animation process, and the like on the object. The term "frame" refers to a time unit used when performing the object movement/motion process or the image generation process.

The object controlled by the object control section 114 may be a three-dimensional object disposed in a three-dimensional object space, or may be a two-dimensional object drawn on a two-dimensional screen (display screen). When the object is an object of a character indicated by a three-dimensional model, the object control section 114 performs a motion process (motion replay or motion generation) that causes the character to make a motion. The motion process may be implemented by reproducing the motion of the character based on motion data stored in a motion data storage section 177, for example. The motion data storage section 177 stores the motion data including the position or the rotation angle (i.e., the rotation angles of a child bone around three axes with respect to a parent bone) of each bone that forms the skeleton of the character (model object) (i.e., each part object that forms the character). A model data storage section 178 stores model data about the model object that indicates the character.

The virtual camera control section 118 controls a virtual camera (viewpoint or reference virtual camera) for generating an image viewed from a given (arbitrary) viewpoint in the object space. Specifically, the virtual camera control section 118 controls the position (X, Y, Z) or the rotation angle (rotation angles around X, Y, and Z axes) of the virtual camera (i.e., controls the viewpoint position, the line-of-sight direction, or the angle of view).

The image generation section 120 performs a drawing process based on the result of various processes (game process and simulation process) performed by the processing section 100 to generate an image, and outputs the generated image to the display section 190. Specifically, the image generation section 120 performs a geometric process (e.g., coordinate transformation (world coordinate transformation and camera coordinate transformation), clipping, perspective transformation, or light source process), and generates drawing data (e.g., primitive surface vertex position coordinates, texture coordinates, color data, normal vector, or α-value) based on the result of the geometric process. The image generation section 120 draws the object (one or more primitive surfaces) subjected to perspective transformation in a drawing buffer 179 (i.e., a buffer (e.g., frame buffer or work buffer) that can store image information in pixel units) based on the drawing data (primitive surface data). The image generation section 120 thus generates an image viewed from the virtual camera (given viewpoint) in the object space. The drawing process may be implemented by a vertex shader process or a pixel shader process.

The image generation section 120 may generate a stereoscopic image. In this case, a left-eye virtual camera and a right-eye virtual camera are disposed using a reference virtual camera position and a reference inter-camera distance. The image generation section 120 generates a left-eye image viewed from the left-eye virtual camera in the object space, and generates a right-eye image viewed from the right-eye virtual camera in the object space. Stereoscopic vision may be implemented by a stereoscopic glass method or a naked-eye method using a lenticular lens or the like by utilizing the left-eye image and the right-eye image.

The sound generation section 130 performs a sound process based on the result of various processes performed by the processing section 100 to generate game sound (e.g., background music (BGM), effect sound, or voice), and outputs the generated game sound to the sound output section 192.

When the image information acquisition section 102 has acquired the image information from the image sensor, the motion information acquisition section 104 acquires motion information about the operator. The correction section 108 performs a correction process based on the motion information.

Examples of the motion information include optical flow information (e.g., motion vector), information that indicates the motion of each part of the operator, skeleton information about the operator, and the like. The optical flow information indicates the motion of the operator in a captured image that has been captured by the image sensor using a motion vector. The information that indicates the motion of each part of the operator specifies the motion of each part of the operator. The skeleton information specifies the motion of the operator viewed from the image sensor. The skeleton information includes a plurality of pieces of joint position information corresponding to a plurality of joints of the operator. Each of the plurality of pieces of joint position information includes three-dimensional coordinate information. Each joint connects bones, and a skeleton is formed by connecting a plurality of bones. The joint position information is used as position information about the bone.

For example, the skeleton information acquisition section 105 acquires the skeleton information about the operator based on the image information from the image sensor. The correction section 108 then performs a correction process on the position information (joint position information) about the bone of the skeleton indicated by the skeleton information, and the image generation section 120 generates an image corresponding to the result of the correction process. The correction process performed on the position information about the bone may be a correction process performed on the position information about the bone, or may be a correction process that corrects another information to obtain a similar effect as in the case of correcting the position information about the bone. For example, the correction process performed on the position information about the bone includes changing the entire shape of the skeleton. The image generation section 120 generates an image corresponding to the result of the correction process, and displays the image on the display section 190.

For example, the object control section 114 controls the object that moves or makes a motion based on the motion of the operator. The object may be a two-dimensional object or a three-dimensional object. The object control section 114 controls the object based on the result of the correction process.

Specifically, the correction section 108 performs the correction process on the position information (joint position information) about the bone of the skeleton to obtain corrected position information. The object control section 114 controls the object based on the corrected position information obtained by the correction process. For example, the object control section 114 determines the drawing position or the like of the object based on the corrected position information. The image generation section 120 generates an image so that the object is displayed at a display position on the screen corresponding to the corrected position information. An image based on the result of the correction process (i.e., an image that reflects the correction process) is thus generated.

The object moves based on the motion of a given part (e.g., hand or foot) of the operator. Specifically, the given part may be the hand of the operator, and the object may be a hand object (icon or cursor) that moves based on the motion of the hand of the operator.

The object control section 114 controls the object based on the result of the correction process in a first mode (game of a first type). For example, corrected position information or the like is calculated by the correction process, and the object is caused to move or make a motion based on the corrected position information or the like.

The object control section 114 controls the object using the skeleton information in a second mode (game of a second type) without using the result of the correction process. For example, when the object is a character, the object control section 114 specifies the motion of the character using the skeleton information obtained based on the image information from the image sensor, and causes the object to make the specified motion. In this case, the motion of the character may be reproduced using motion data set based on the skeleton information. Alternatively, a motion pattern corresponding to the acquired skeleton information may be selected from a plurality of motion patterns, and the motion of the character may be reproduced using motion data about the selected motion pattern.

The correction section 108 performs the correction process so that the display position of the object when the skeleton of a first operator is in a first state is identical with the display position of the object when the skeleton of a second operator is in the first state. For example, when the first operator is an adult, and the second operator is a child, the correction section 108 performs the correction process so that the display position of the object (e.g., right hand object) when the skeleton of the adult operator is in the first state (e.g., the right hand is raised) is identical with the display position of the object when the skeleton of the child operator is in the first state.

The correction section 108 may perform the correction process using physique information about the operator. The physique information indicates the size, the shape, and the like of the body of the operator. Specifically, the correction section 108 may perform the correction process using joint distance information that indicates the distance between a first joint (e.g., shoulder joint) and a second joint (e.g., joint of the hand) of the skeleton as the physique information. Alternatively, the correction section 108 may perform the correction process using distance information obtained from joint-to-joint distance information acquired over a plurality of frames. For example, the correction section 108 averages the joint-to-joint distance information acquired over a plurality of frames, and performs the correction process using the resulting distance information.

The correction section 108 may determine the angle formed by a first direction that connects the position (representative position) of the operator with the image sensor and a second direction that connects the position of the operator with the position of a joint corresponding to a given part (e.g., hand or foot) of the operator, and may then perform the correction process. For example, the correction section 108 calculates the display position of the object based on the determined angle. This makes it possible to calculate the drawing position of the object without calculating the corrected position information directly from the position information about the bone.

The game calculation section 110 may perform the game calculation process corresponding to the result of the correction process (e.g., corrected position information or the angle formed by a first direction and a second direction). The image generation section 120 generates an image corresponding to the result of the game calculation process, so that an image corresponding to the result of the correction process (i.e., an image that reflects the correction process) is generated. For example, the game calculation section 110 performs a game result calculation process based on the result of the correction process as the game calculation process. Specifically, the result of the correction process is reflected in game result calculations. Specifically, the correction section 108 performs the correction process on moving amount information about the position of the bone of the skeleton to obtain corrected moving amount information. The game calculation section 110 performs the game result calculation process based on the corrected moving amount information. For example, the game result is adjusted by utilizing the corrected moving amount information so that a disadvantage does not occur depending on an individual difference (e.g., adult and child). Note that the moving amount information indicates the moving amount of the position of the bone of the skeleton within a given unit time (e.g., one frame), for example.

The correction section 108 may perform the correction process that changes the size of the character. Specifically, the correction section 108 performs the correction process that changes the size of the character by a scaling factor (enlargement factor or reduction factor) based on the positional relationship between the character and a contact target object (hit target object or play target object) that is a contact target of the character. For example, the correction section 108 changes the size of the character so that a part of the character can come in contact with the contact target object. The positional relationship between the contact target object and the character may be the distance between the contact target object and the character, the placement relationship between the contact target object and the character, or the like. The correction section 108 may perform the correction process that adjusts the position of the character based on the positional relationship between the contact target object and the character. Specifically, the correction section 108 adjusts the position of the character in addition to the size of the character.

The correction section 108 may perform the correction process based on aspect ratio information that indicates the relationship between the aspect ratio (e.g., 4:3) of the image sensor and the aspect ratio (e.g., 16:9) of the display section 190. For example, the correction section 108 performs the correction process on the motion information acquired by the motion information acquisition section 104 based on the aspect ratio information. The correction section 108 also performs the correction process on the movement or the motion of the object based on the aspect ratio information. Specifically, the correction section performs the correction process so that the moving amount of the object in the horizontal direction of the screen of the display section 190 is larger than the moving amount of the object in the vertical direction of the screen of the display section 190 with respect to the motion of the operator.

The reliability information acquisition section 106 acquires reliability information that indicates the reliability of the skeleton information. The image generation section 120 generates an image corresponding to the acquired reliability information as an image displayed on the display section 190. For example, the image generation section 120 changes the display state of the image displayed on the display section 190 based on the reliability information. When the game calculation section 110 has performed the game calculation process based on the reliability information, or the object control section 114 has performed the object control process based on the reliability information, the image generation section 120 generates an image corresponding to the reliability information by generating an image based on the game calculation process or the object control process.

For example, the reliability information acquisition section 106 acquires the reliability information in which the reliability of the information about each bone (position information or link (relationship) information) is linked to each bone (joint) of the skeleton indicated by the skeleton information. The skeleton information includes the position information about each bone (each joint) that is linked to each part (e.g., hand, foot, waist, trunk, neck, or head) of the operator. In this case, the reliability indicated by the reliability information indicates the reliability of a link (relationship) between each part and each bone of the operator and the position information about each bone.

The reliability information acquisition section 106 acquires the reliability information in which the reliability of information (position information or link information) about the bone corresponding to a given part (e.g., hand or foot) of the operator decreases as the given part approaches another part (e.g., trunk, head, or the other hand or foot) of the operator. Specifically, the reliability information acquisition section 106 acquires the reliability information in which the reliability decreases when the given part cannot be distinguished from another part. Alternatively, the reliability information acquisition section 106 acquires the reliability information in which the reliability of the information about the bone included in the skeleton information decreases when the operator is positioned at a distance equal to or greater than a given distance from the image sensor. Specifically, the reliability information acquisition section 106 acquires the reliability information in which the reliability information decreases when the operator is positioned away from the image sensor, and it is impossible (or very difficult) to acquire the reliability information from the image information from the image sensor. The skeleton information and the reliability information may be integrated.

The image generation section 120 changes the display state of the image displayed on the display section 190 based on the acquired reliability information. In this case, the image generation section 120 may change the display state of the image displayed on the display section 190 based on prediction information (e.g., change rate information) about a change in reliability indicated by the reliability information. For example, the image generation section 120 changes the display state of the image when it has been predicted that the reliability will become equal to or lower than a given threshold value.

Specifically, the image generation section 120 changes the display state of an object displayed on the display section 190 corresponding to a given part (e.g., hand or foot) of the operator based on the reliability of the information about the bone (bone/joint of the hand or foot) corresponding to the given part. The object displayed corresponding to the given part is an object that moves or make a motion based on the motion of the given part, and may be a two-dimensional object or a three-dimensional object.

The image generation section 120 performs at least one of a process that blurs the object corresponding to the given part (blur filter process), a process that displays the object corresponding to the given part almost transparently (process that changes the α-value), and a process that changes the color of the object corresponding to the given part (process that changes the color of the object to a color close to the target color), as the reliability of the information about the bone corresponding to the given part decreases. Alternatively, the image generation section 120 may perform at least one of a process that changes the brightness (luminance) of the object corresponding to the given part, a process that changes the display state (width or depth) of the contour of the object corresponding to the given part, a process that changes the size of the object corresponding to the given part, and a process that changes an effect applied to the object corresponding to the given part, as the reliability of the information about the bone corresponding to the given part decreases.

2. Method

The method according to one embodiment of the invention is described in detail below.

2.1 Correction Process

A game device or a visual instrument (e.g., television set or record/play instrument) is normally configured so that the operator (user) performs an instruction operation using a button or a lever of a controller (remote controller). A game device or the like may be configured so that a controller includes a motion sensor (six-axis sensor), and the operator performs an instruction operation by moving the controller.

However, a game device or the like that utilizes such an operation interface requires a controller for performing an operation, and cannot implement an operation that directly reflects a gesture (e.g., hand (arm) movement) made by the operator.

In order to deal with this problem, one embodiment of the invention employs an operation interface that detects an operation input performed by the operator based on image information captured by an image sensor.

Figure 2A:
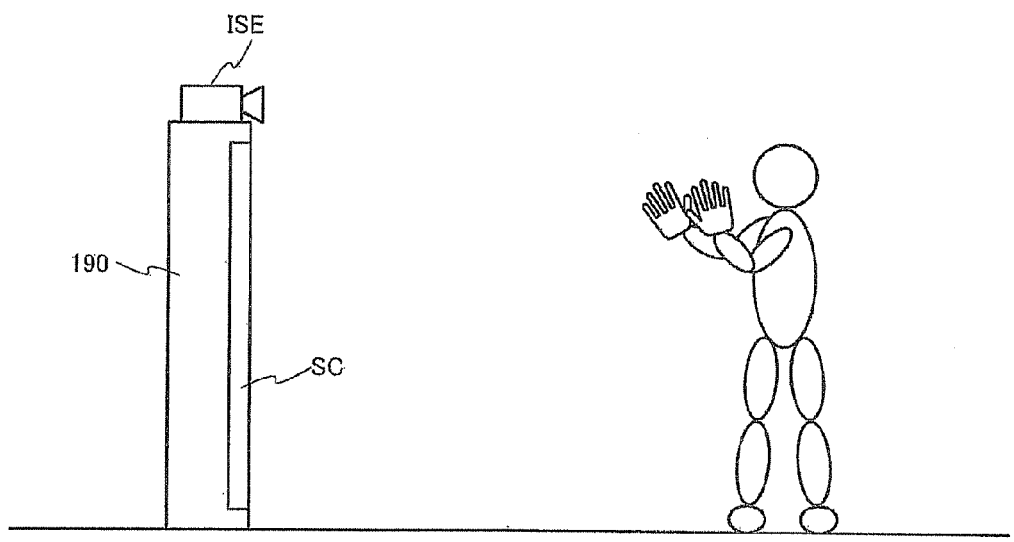
FIGS. 2A and 2B are views illustrative of an operation interface according to one embodiment of the invention that utilizes imaging information from an image sensor.

In FIG. 2A, an image sensor ISE that is implemented by a depth sensor (e.g., infrared sensor) and a color image sensor (RGB sensor (e.g., CCD or CMOS sensor)) is installed at a position corresponding to the display section 190 (screen SC). The image sensor ISE is installed so that its imaging direction (optical axis direction) coincides with the direction from the display section 190 to the operator, for example. The image sensor ISE acquires (captures) color image information and depth information about the operator viewed from the display section 190. The image sensor ISE may be provided in the display section 190, or may be provided as an external element (component). The installation position of the image sensor ISE is not limited to the position shown in FIG. 2A. The image sensor ISE may be installed at an arbitrary position (e.g., lower area of the display section 190).

Figure 2B:
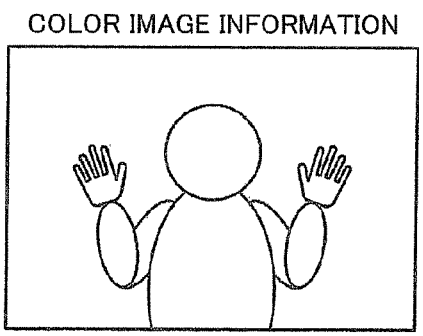
Figure 2B:
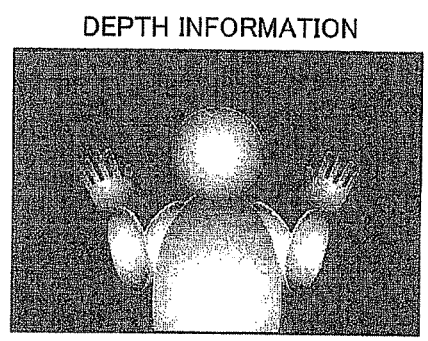

Color image information and depth information shown in FIG. 2B are acquired using the image sensor ISE shown in FIG. 2A. For example, the color image information includes color information about the operator and his surroundings. The depth information includes the depth values of the operator and his surroundings as grayscale values, for example. The color image information may be image information in which the color value (RGB) is set to each pixel position, and the depth information may be image information in which the depth value is set to each pixel position, for example. Note that the image sensor ISE may be a sensor in which the depth sensor and the color image sensor are separately provided, or may be a sensor in which the depth sensor and the color image sensor are integrated.

The depth information may be acquired by a known method. For example, the depth information is acquired by emitting light (e.g., infrared radiation) from the image sensor ISE (depth sensor), and detecting the reflection intensity or the time of flight of the emitted light to detect the shape of the object (e.g., operator) viewed from the position of the image sensor ISE. The depth information is indicated by grayscale data (e.g., an object positioned near the image sensor ISE is bright, and an object positioned away from the image sensor ISE is dark).

Note that the depth information may be acquired in various ways. For example, the depth information (i.e., information about the distance from the object) may be acquired simultaneously with the color image information using a CMOS sensor or the like. The depth information may also be acquired using a distance sensor (ranging sensor) or the like that utilizes ultrasonic waves, for example.

In one embodiment of the invention, motion information about the operator (player or user) viewed from the image sensor ISE is acquired based on the image information from the image sensor ISE. A correction process is performed on the acquired motion information. The motion information includes optical flow information, information that indicates the motion of the operator, skeleton information about the operator, and the like.

Figure 3:
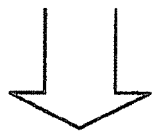
Figure 3:
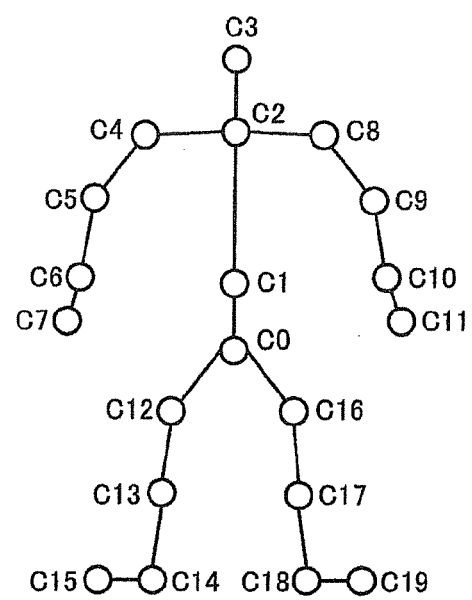

As shown in FIG. 3, skeleton information (motion information in a broad sense) used to specify the motion of the operator is acquired based on the depth information shown in FIG. 2B, for example. In FIG. 3, position information (three-dimensional coordinates) about bones of a skeleton has been acquired as position information about joints C0 to C19. The bones of the skeleton correspond to the parts (e.g., hand, foot, and chest) of the operator captured by the image sensor ISE, and the joints C0 to C19 correspond to the joints of the operator captured by the image sensor ISE.

For example, the three-dimensional shape of the operator or the like viewed from the image sensor ISE can be acquired using the depth information shown in FIG. 2B. The area of each part (e.g., face) of the operator can be specified by face image recognition or the like when using the color image information in combination with the depth information. Therefore, each part of the operator and the joint position of each part are estimated based on the three-dimensional shape information, the motion vector (optical flow) of the image, and the like. The three-dimensional coordinate information about the joint position of the skeleton is calculated based on the two-dimensional coordinates of the pixel position of the depth information corresponding to the estimated joint position, and the depth information set to the pixel position to acquire the skeleton information shown in FIG. 3. More specifically, a plurality of models that differ in body shape and physique are provided. A matching process is performed on the body shape/physique of the operator and the body shape/physique of the plurality of models using the depth information and the color image information about the operator obtained using the image sensor ISE to specify a model having a body shape/physique similar to that of the operator. The joint position (i.e., the position of the bone/part) of the operator is estimated using the information about the joint position of the specified model or the like to acquire the skeleton information.

The motion of the operator can be specified in real time by utilizing the skeleton information, so that a novel operation interface environment can be implemented. Moreover, the skeleton information has high compatibility with the motion data about the character disposed in the object space. Therefore, the character (avatar) corresponding to the operator can be caused to make a motion in the object space by utilizing the skeleton information as the motion data about the character, for example.

However, the body shape/physique of the operator differs depending on the height, age, and the like. When causing the object to move or make a motion on the screen based on the motion of the operator, it is desirable that the movement/motion range cover the entire screen.

In one embodiment of the invention, a correction process is performed on the position information (joint position information) about the bone indicated by the skeleton information (see FIG. 3), and an image is generated based on the result of the correction process.

Figure 4A:
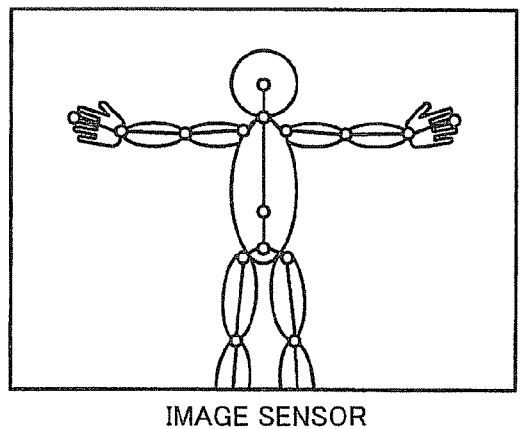
FIGS. 4A and 4B are views illustrative of a correction process according to one embodiment of the invention.

FIG. 4A shows an example of a captured image (image information (e.g., color image)) of an adult operator captured using the image sensor ISE. Skeleton information shown in FIG. 4A is acquired from the captured image.

Figure 4B:
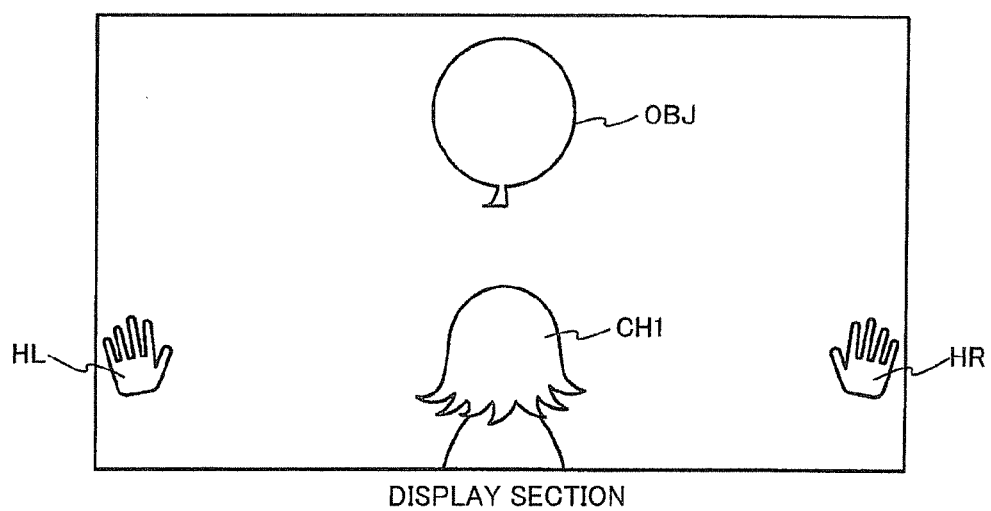

An image shown in FIG. 4B is generated based on the motion of the skeleton of the operator shown in FIG. 4A, and displayed on the display section 190. Specifically, the right hand object HR shown in FIG. 4B moves on the screen based on the motion of the right hand of the skeleton of the operator shown in FIG. 4A, and the left hand object HL moves on the screen based on the motion of the left hand of the skeleton of the operator shown in FIG. 4A. For example, when the operator has moved the right hand around, the right hand object HR moves on the screen in the same manner as the right hand of the operator. When the operator has moved the left hand around, the left hand object HL moves on the screen in the same manner as the left hand of the operator. For example, the operator enjoys a mini-game in which the operator breaks a balloon by quickly causing the hand object HR or HL to come in contact with an object OBJ (contact target object) that is displayed on the screen and imitates a balloon. Note that CH1 indicates a character used as an avatar of the adult operator.

Figure 5A:
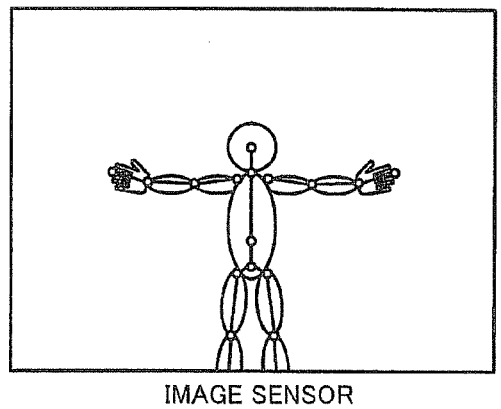
FIGS. 5A and 5B are views illustrative of a correction process according to one embodiment of the invention.
Figure 13A:
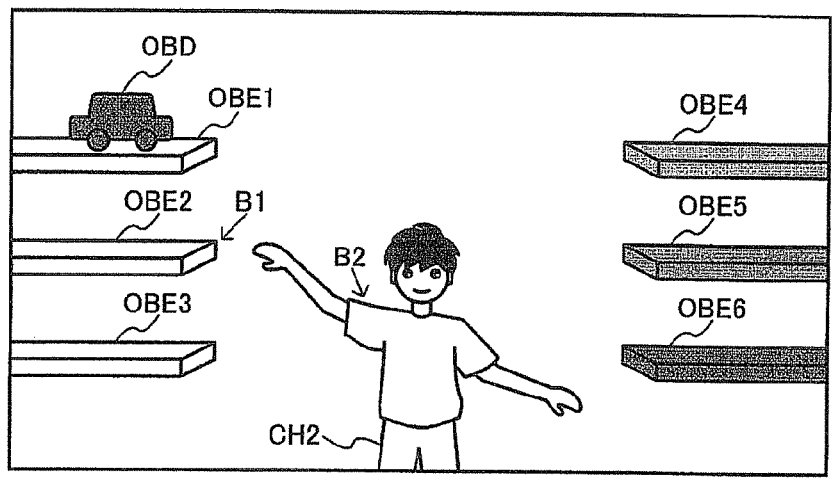
FIGS. 13A and 13B are views illustrative of a correction process that adjusts the position of a character.

FIG. 5A shows an example of a captured image of a child operator captured using the image sensor ISE. Skeleton information shown in FIG. 13A is acquired from the captured image.

Figure 5B:
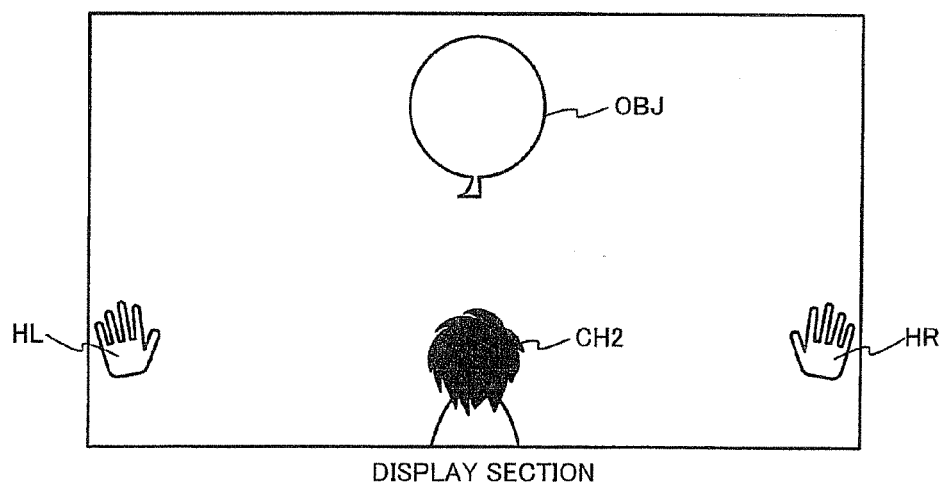

An image shown in FIG. 5B is generated based on the motion of the skeleton of the operator shown in FIG. 5A, and displayed on the display section 190. Specifically, the right hand object HR and the left hand object HL shown in FIG. 5B move on the screen in the same manner as (based on the motion of) the right hand and the left hand of the skeleton of the operator shown in FIG. 5A. Note that CH2 indicates a character used as an avatar of the child operator.

When acquiring the skeleton information about the operator, and moving the hand objects HR and HL on the screen in this manner, if the hand objects HR and HL are moved directly using the position information about the bone included in the skeleton information, a difference in moving range of the hand objects HR and HL occurs between a case where the operator is an adult and a case where the operator is a child.

For example, when the operator is an adult (see FIG. 4A), the hand objects HR and HL move over a wide range. On the other hand, when the operator is a child (see FIG. 5A), the hand objects HR and HL move within a narrow range. For example, when the moving range of the hand objects HR and HL is narrow, it is difficult to cause the hand objects HR and HL to come in contact with the contact target object OBJ. For example, when the object OBJ is disposed in an area around the edge of the screen, it may be impossible for the child operator to cause the hand objects HR and HL to come in contact with the object OBJ. Therefore, some operators may play the game advantageously depending on physique, age, and the like (i.e., the game may become unfair).

According to one embodiment of the invention, the correction process is performed on the position information about the bone, and the hand objects HR and HL are then moved, instead of causing the hand objects HR and HL to move or make a motion directly using the position information about the bone included in the skeleton information. Specifically, the movement or the like of the object is controlled based on the result of the correction process. Therefore, the hand objects HR and HL move to the edge of the screen (see FIGS.

4B and 5B) not only when the adult operator has spread the arms (see FIG. 4B), but also when the child operator has spread the arms (see FIG. 5A). Specifically, the correction process is performed so that the display positions of the objects HR and HL when the skeleton of the adult operator (first operator in a broad sense) has spread the arms (first state in a broad sense) are identical (almost identical) with the display positions of the objects HR and HL when the skeleton of the child operator (second operator in a broad sense) has spread the arms (first state in a broad sense).

This makes it possible for the operator to move the hand objects HR and HL almost over the entire area of the screen (moving range) irrespective of whether the operator is an adult or a child, for example. This makes it possible to prevent a situation in which some operators may play the game advantageously depending on physique, age, and the like (i.e., a fair game can be implemented).

An example of the correction process according to one embodiment of the invention is described below with reference to FIGS. 6A and 6B. Specifically, corrected position information is obtained by performing the correction process on the position information about the bone of the skeleton. The object is controlled based on the corrected position information to generate an image in which the object is displayed at a display position on the screen corresponding to the corrected position information.

Figure 6A:
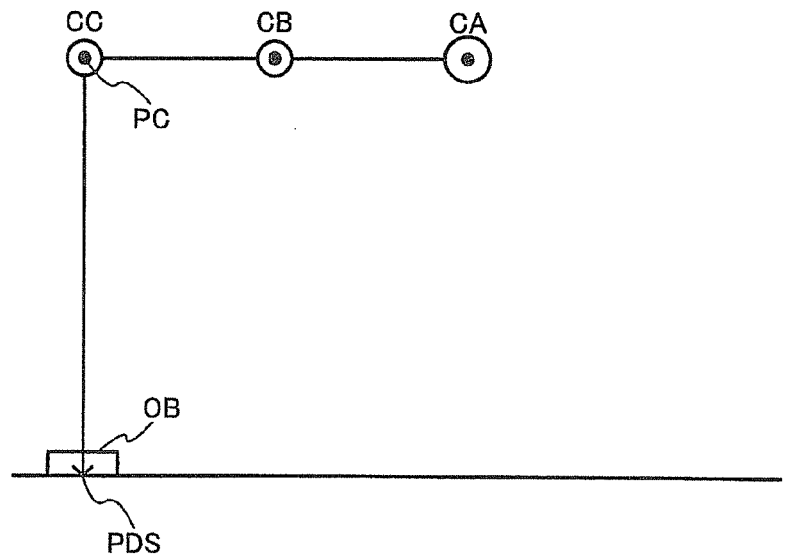
FIGS. 6A and 6B are views illustrative of a method that calculates a drawing position based on corrected position information.

FIG. 6A is a view illustrative of a case where the correction process is not performed. In FIG. 6A, CC indicates a joint (finger joint or wrist joint) of a hand, for example. When the correction process is not performed, a display position PDS on the screen is calculated based on a position PC of the joint CC. For example, the display position PDS is calculated by projecting the position CC onto the screen. An image is then generated so that the object OB is displayed at the display position PDS.

Figure 6B:
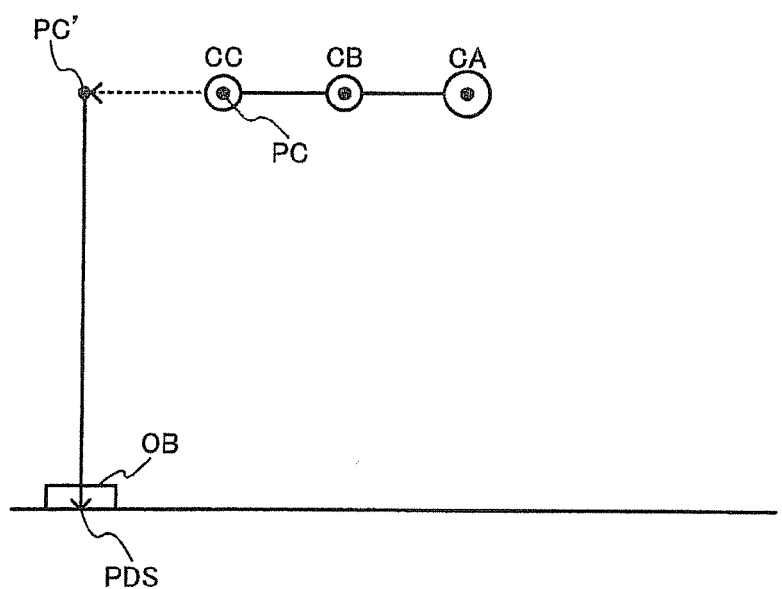

FIG. 6B is a view illustrative of a case where the correction process is performed. In FIG. 6B, a corrected position PC' is calculated by performing the correction process on the position PC (position of the bone of the hand) of the joint CC. For example, when the operator is a child (see FIG. 5A), it is considered that the length of the arm is shorter than that of a reference operator. Therefore, a position obtained by extending the position PC along the arm is calculated as the corrected position PC'. The display position PDS on the screen is calculated based on the corrected position PC', and an image is generated so that the object OB is displayed (disposed) at the display position PDS. Therefore, the hand objects HR and HL reach the edge of the screen (see FIG. 5B) when the child operator has fully spread the arms. On the other hand, when the operator is an adult with a good physique, it is considered that the length of the arm is greater than that of the reference operator. Therefore, a position obtained by moving the position PC along the arm toward the trunk is calculated as the corrected position PC'.

When performing the correction process based on comparison with the reference operator, the correction process may be performed using physique information about the operator. The physique information (body shape information or skeleton information) indicates the physique and the like of the operator. For example, the physique information includes information about the distance between the joints of the operator, information about the length of each part, and the like. The physique information may be calculated based on the skeleton information shown in FIG. 3, for example.

Specifically, the skeleton information shown in FIG. 3 includes the joint position information (i.e., position information about each bone of the skeleton of the operator) (described later). In this case, distance information about the distance between a first joint and a second joint of the skeleton may be used as the physique information, and the correction process shown in FIG. 6B and the like is performed using the distance information (i.e., physique information).

Figure 7A:
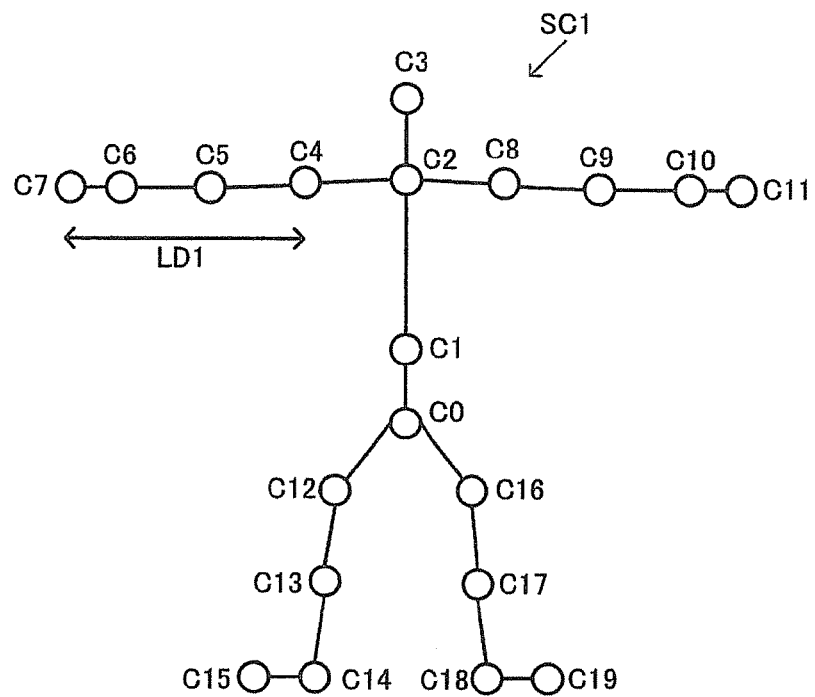
FIGS. 7A and 7B are views illustrative of a correction process based on physique information about an operator.
Figure 7B:
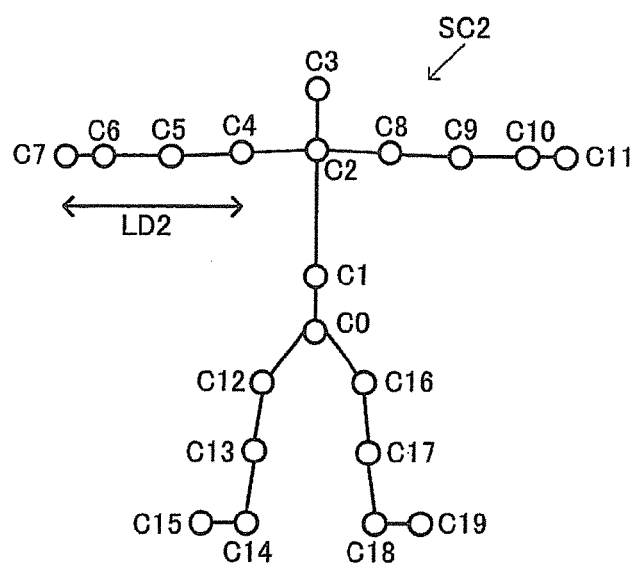

FIG. 7A shows skeleton information SC1 about a first operator with a good physique, and FIG. 7B shows skeleton information SC2 about a second operator with a small physique. In this case, a joint-to-joint distance LD1 between a shoulder joint C4 and a hand joint C7 (finger joint or wrist joint) is calculated from the skeleton information SC1 shown in FIG. 7A. A joint-to-joint distance LD2 between the shoulder joint C4 and the hand joint C7 is calculated from the skeleton information SC2 shown in FIG. 7B. The correction process shown in FIG. 6B and the like is performed using the joint-to-joint distances LD1 and LD2.

For example, when the skeleton information about the operator acquired using the image sensor is the skeleton information SC1 (with a good physique) shown in FIG. 7A, the corrected position PC' shown in FIG. 6B is calculated based on information about the ratio of the joint-to-joint distance LD1 to a reference distance LDR, or the like. When the skeleton information about the operator is the skeleton information SC2 (with a small physique) shown in FIG. 7B, the corrected position PC' shown in FIG. 6B is calculated based on information about the ratio of the joint-to-joint distance LD2 to the reference distance LDR, or the like. This makes it possible to implement a correction process that absorbs the difference in physique information between the operators.

The distance information used as the physique information indicates the physique/body shape of the operator, and is not limited to the joint-to-joint distance shown in FIGS. 7A and 7B. Various modifications may be made. For example, the correction process may be performed using distance information obtained from the joint-to-joint distance of the left hand and the joint-to-joint distance of the right hand.

Alternatively, the correction process may be performed using distance information obtained from the joint-to-joint distances acquired over a plurality of frames. For example, the joint-to-joint distances acquired over a plurality of frames are averaged, and the correction process is performed using the resulting distance information. Specifically, when acquiring the skeleton information based on the image information from the image sensor, the joint-to-joint distance obtained from the skeleton information may vary (e.g., an irregular joint-to-joint distance may be obtained in a specific frame). When the correction process is performed using such an irregular joint-to-joint distance, the display position PDS of the object OB shown in FIG. 6B may change, so that the object OB may be displayed at an unintended position, or the image of the object OB may flicker.

When averaging the joint-to-joint distances acquired over a plurality of frames, the effect of an irregular joint-to-joint distance obtained in a specific frame is reduced. This makes it possible to prevent a situation in which the object OB is displayed at an unintended position, or the image of the object OB flickers due to a change in the display position PDS.

Figure 8A:
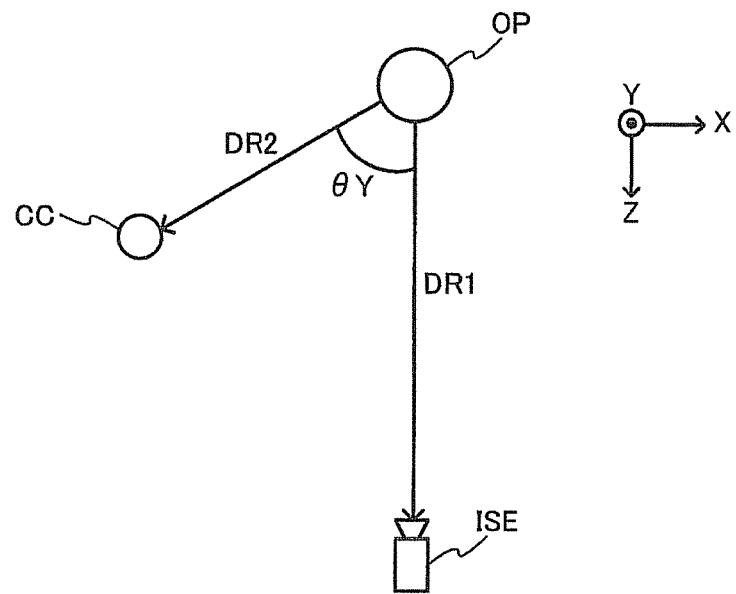
FIGS. 8A and 8B are views illustrative of a correction process using the angle formed by a first direction and a second direction.
Figure 8B:
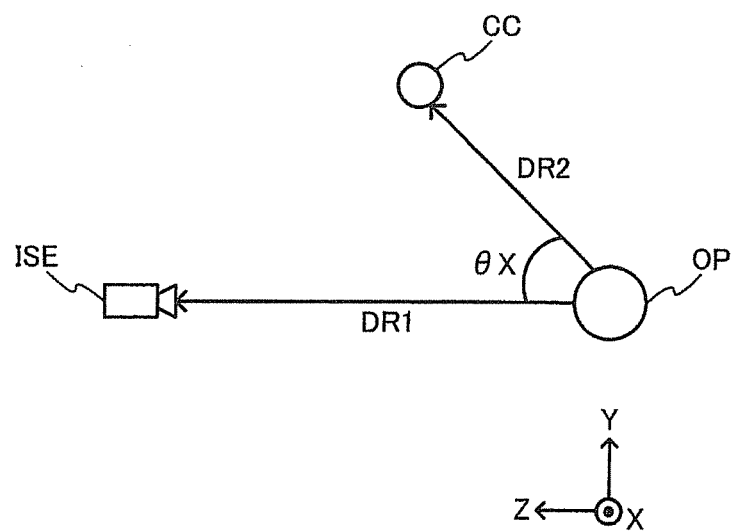

FIGS. 8A and 8B show another example of the correction process according to one embodiment of the invention. In the correction process shown in FIGS. 8A and 8B, angles $\theta Y$ and $\theta X$ formed by a first direction DR1 that connects the position of an operator OP with the image sensor ISE and a second direction DR2 that connects the position (e.g., shoulder) of the operator OP with the position of a joint CC corresponding to a given part (e.g., hand) are determined, and the correction process is performed.

For example, the angle θY shown in FIG. 8A is an angle (rotation angle) around a Y-axis (coordinate axis) in the vertical direction, and the angle θX is an angle (rotation angle) around an X-axis (coordinate axis) in the horizontal direction (Y-direction). The X-coordinate of the display position of the object on the screen can be specified using the angle θY. The Y-coordinate of the display position of the object on the screen can be specified using the angle θX. For example, when the angle θY approaches 90° or −90°, the display position of the object approaches the left end or the right end of the screen. When the angle θY approaches 0°, the display position approaches the center of the screen. When the angle θX approaches 90° or −90°, the display position of the object approaches the upper end or the lower end of the screen. When the angle θX approaches 0°, the display position approaches the center of the screen.

According to the method shown in FIGS. 8A and 8B, since the angles θY and θX are determined, and the correction process is performed on the position information about the bone to determine the display position of the object, a correction process that automatically absorbs the difference in physique (e.g., length of the arm) between the operators can be implemented. It is possible to deal with a situation in which the operator has bent the arm by correcting the angles θY and θX using the joint-to-joint distance LD1 or LD2 (see FIGS. 7A and 7B), for example. When the operator has bent the arm so that the joint-to-joint distance LD1 or LD2 has decreased, the absolute values of the angles θY and θX are reduced, for example.

2.2 Application of Result of Correction Process to Game Calculation Process

In one embodiment of the invention, the result of the correction process may be reflected in the game calculation process. For example, the game calculation process (e.g., game result calculation process or game process) is performed based on the result of the correction process.

Figure 9A:
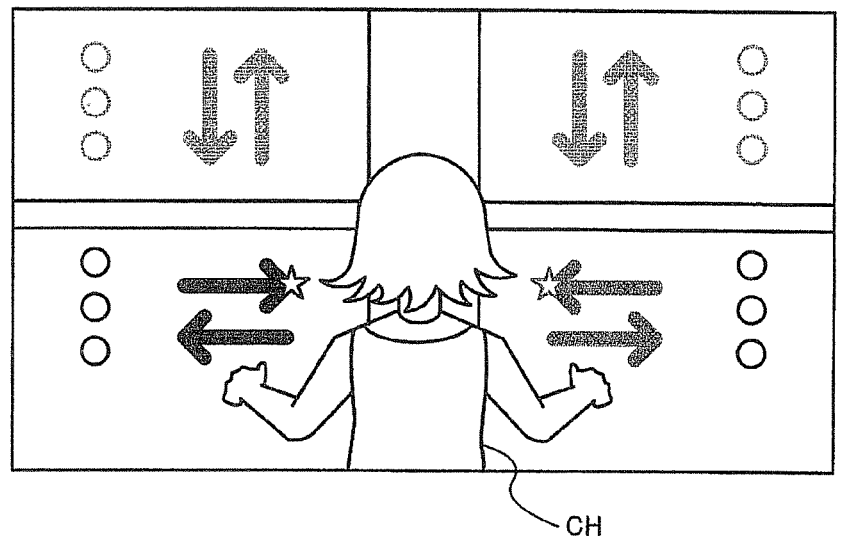
FIGS. 9A and 9B are views illustrative of a game calculation process based on corrected moving amount information.
Figure 9B:
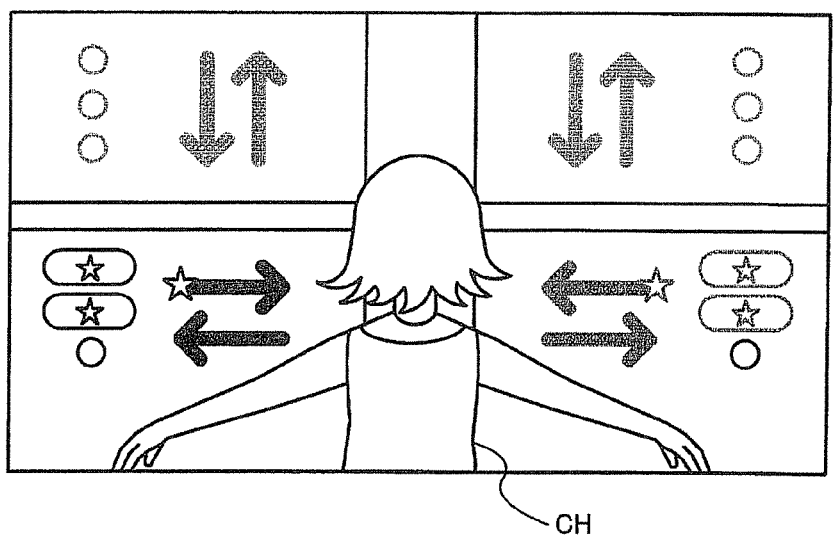

In FIGS. 9A and 9B, the operator moves the arms outward and inward in accordance with an instruction indicated by an arrow displayed on the screen, for example. The character CH (i.e., an avatar of the operator) moves the arms outward and inward based on the motion of the operator. When the operator has made the instructed motion at the instructed timing, the operator can make a score.

In this case, the operator cannot make a score by merely moving the arms outward and inward in accordance with the instruction displayed on the screen. The operator can make a score when the moving amount of the position of the hand has exceeded a given threshold value. Specifically, the operator cannot make a score when the moving amount of the position of the hand is small.

However, when the operator is a child with a small physique (see FIG. 5A), the moving amount of the position of the hand is small when the operator moves the arms outward and inward. Therefore, the hand motion of a child operator may not exceed the threshold value even if the child operator has made a hand motion that would exceed the threshold value when made by an adult operator. Therefore, some operators may play the game advantageously (disadvantageously) (i.e., the game may become unfair).

In one embodiment of the invention, the correction process is performed on the moving amount information (e.g., the moving amount of the position of the hand) about the position of the bone of the skeleton to obtain corrected moving amount information, and a game result calculation process is performed based on the corrected moving amount information.

For example, when the operator is a child, the correction process is performed on the moving amount of the position of the bone of the skeleton to calculate a corrected moving amount that is larger than the moving amount of the position of the bone of the skeleton. The game result calculation process (see FIGS. 9A and 9B) is performed based on the corrected moving amount. When the operator is an adult with a good physique, the correction process is performed on the moving amount of the position of the bone of the skeleton to calculate a corrected moving amount that is smaller than the moving amount of the position of the bone of the skeleton. The game result calculation process (see FIGS. 9A and 9B) is performed based on the corrected moving amount.

Note that whether the operator is an adult or a child may be determined by the method described with reference to FIGS. 7A and 7B. For example, the corrected moving amount can be made equal when an adult operator and a child operator have made an identical motion by calculating the corrected moving amount based on the ratio of the joint-to-joint distance LD1 to the reference distance LDR (see FIG. 7A) or the ratio of the joint-to-joint distance LD2 to the reference distance LDR (see FIG. 7B). For example, when the operator is an adult, the correction process that reduces the moving amount of the skeleton is performed based on the ratio of the joint-to-joint distance LD1 to the reference distance LDR to calculate the corrected moving amount. When the operator is a child, the correction process that increases the moving amount of the skeleton is performed based on the ratio of the joint-to-joint distance LD2 to the reference distance LDR to calculate the corrected moving amount. Therefore, since the corrected moving amount of the child operator increases even if the actual moving amount of the position of the hand is small, it is determined that the moving amount (corrected moving amount) has exceeded the threshold value during the game result calculation process shown in FIGS. 9A and 9B, and the child operator can make a score. Specifically, the game calculation process (game result calculation process) is performed based on the result of the correction process. This makes it possible to prevent a situation in which a child operator or an adult operator plays the game disadvantageously or advantageously (i.e., a fair game can be implemented).

The result of the correction process may be reflected in various games. In a boating game, for example, when a child operator has performed a rowing motion similar to that of an adult operator, the rowing amount and the rowing speed/acceleration are smaller than those of the adult operator. Therefore, the child operator must play the game in an adverse condition. In this case, the rowing amount, the rowing speed/acceleration, and the like are corrected using the physique information (LD1, LD2) described with reference to FIGS. 7A and 7B, for example. Specifically, the correction process is performed so that a child operator and an adult operator achieve an identical rowing amount and an identical rowing speed/acceleration by making a similar rowing motion. This makes it possible to prevent a situation in which a child operator or an adult operator plays the game disadvantageously or advantageously (i.e., a fair game can be implemented).

In one embodiment of the invention, a first mode and a second mode are provided. In the first mode, the object is controlled using the result of the correction process. In the second mode, the object is controlled using the skeleton information without using the result of the correction process.

For example, FIGS. 4A to 5B, 9A, and 9B show a game performed in the first mode. Specifically, the correction process is performed on the position information about the bone included in the skeleton information, and the object is controlled based on the result of the correction process (e.g., corrected position, corrected moving amount, corrected speed, or corrected acceleration). In FIGS. 4A to 5B, the correction process is performed so that the hand objects HR and HL are located at identical positions when a child operator and an adult operator have made a similar motion. In FIGS. 9A and 9B, the correction process is performed so that the moving amount of the hand of the character CH is identical when a child operator and an adult operator have made a similar motion. This makes it possible to implement a game that absorbs the difference in physique, age, and the like between the operators.

Figure 10A:
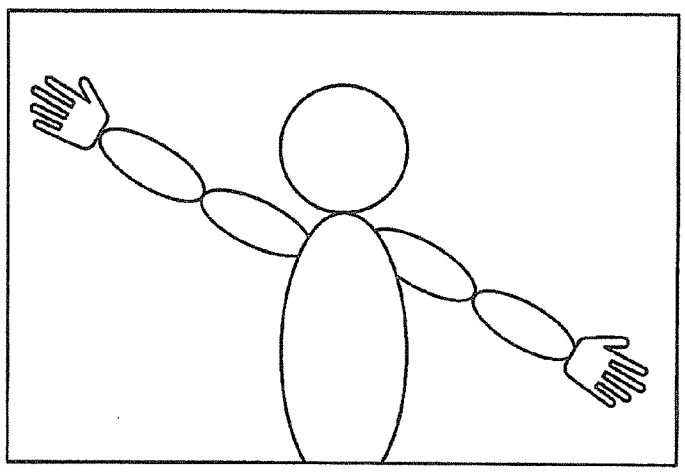
FIGS. 10A and 10B are views illustrative of a game in a second mode.
Figure 10B:
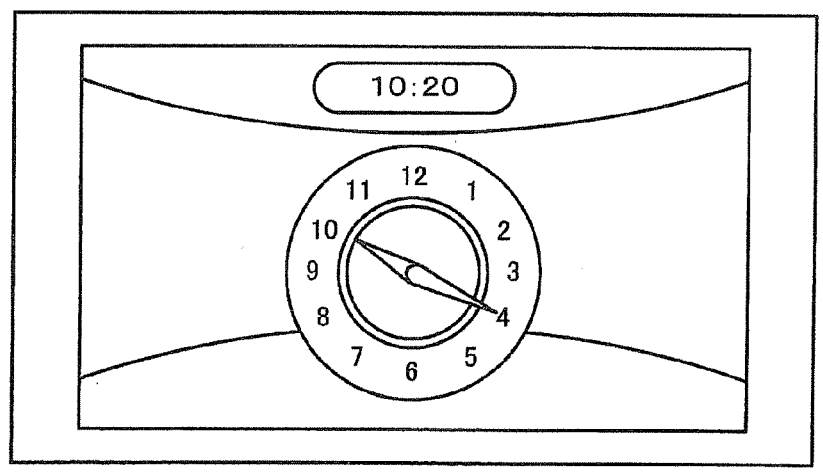

FIGS. 10A and 10B show a game performed in the second mode. In the second mode, the object is controlled based on the skeleton information without performing the correction process on the position of the bone included in the skeleton information. Note that FIG. 10A is a rear view of the operator.

In FIGS. 10A and 10B, the operator makes a posture with both hands as if to imitate the hands of a clock corresponding to the time displayed on the screen, for example. In FIG. 10B, the clock indicates the time "10:20 (ten-twenty)". In this case, the operator makes a posture so that the right hand corresponding to the hour hand of the clock indicates "10", and the left hand corresponding to the minute hand of the clock indicates "20". When the operator has made a posture that coincides with the state of hands of the clock corresponding to the time, the operator makes a score.

In the game in the second mode (see FIGS. 10A and 10B), only the angle of the arm (hand) is determined, and the position of the bone of the hand is not determined. Therefore, the object (clock hand) is controlled (e.g., directly) using the skeleton information about the operator acquired by the image sensor without performing the correction process described with reference to FIGS. 6A and 6B, for example.

It is possible to efficiently implement appropriate object control based on the type of game and the like by providing the first mode and the second mode.

2.3 Correction Process On Size and the like of Character

Various characters that differ in physique/body shape and the like appear in a game as a character used as an avatar of the operator. For example, a character used as an avatar of an adult with a good physique, and a character used as an avatar of a child with a small physique may appear in a game. The physique/body shape of each character has been determined based on model data.

However, when implementing a game that controls the object of a character that moves or makes a motion based on the motion of the operator, a problem may occur if the character having a physique/body shape determined based on the model data appears in the game.

In one embodiment of the invention, a correction process that changes the size of a character used as an avatar of the operator, or adjusts the placement position of the character, is performed. The following description is given using an adult character as an example of a character with a good physique, and using a child character as an example of a character with a small physique.

Figure 11A:
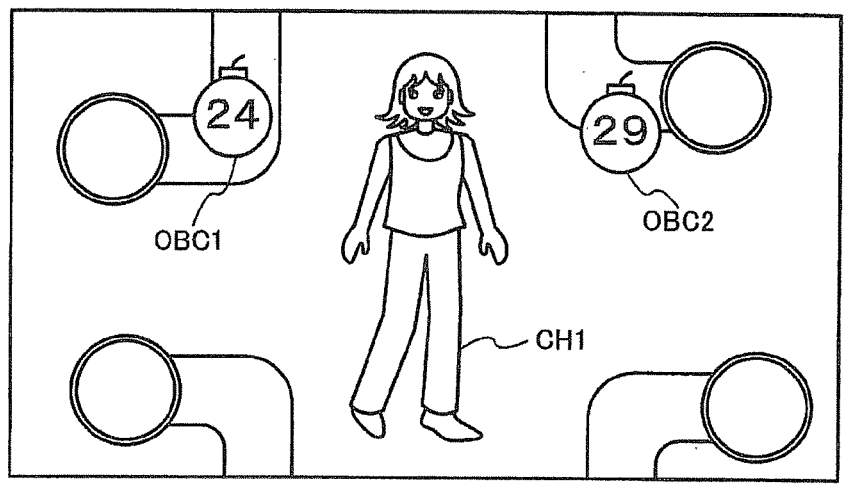
FIGS. 11A and 11B are views illustrative of a correction process that changes the size of a character.
Figure 11B:
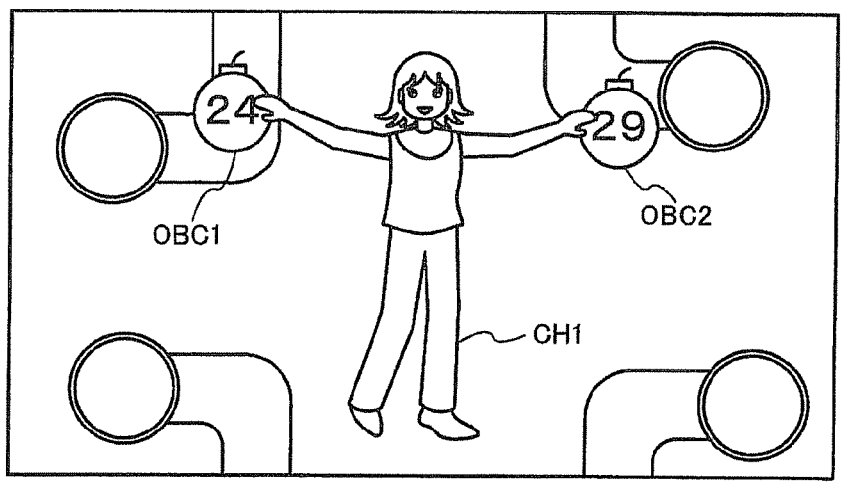
Figure 12A:
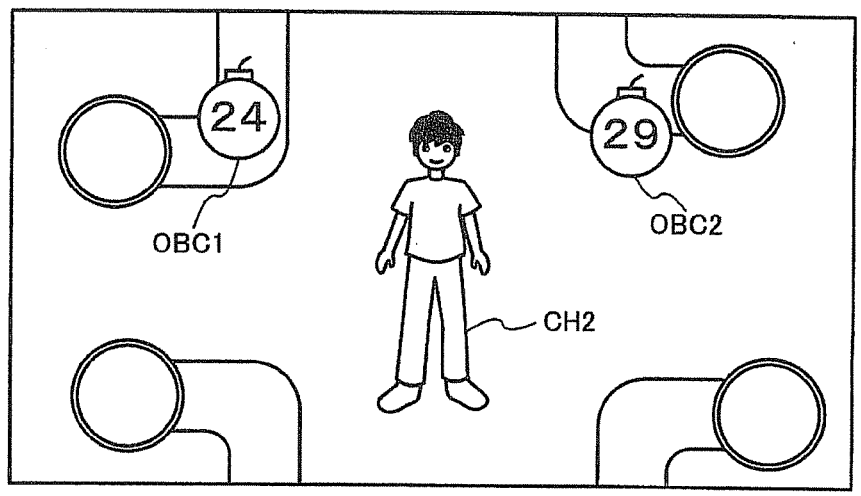
FIGS. 12A and 12B are views illustrative of a correction process that changes the size of a character.
Figure 12B:
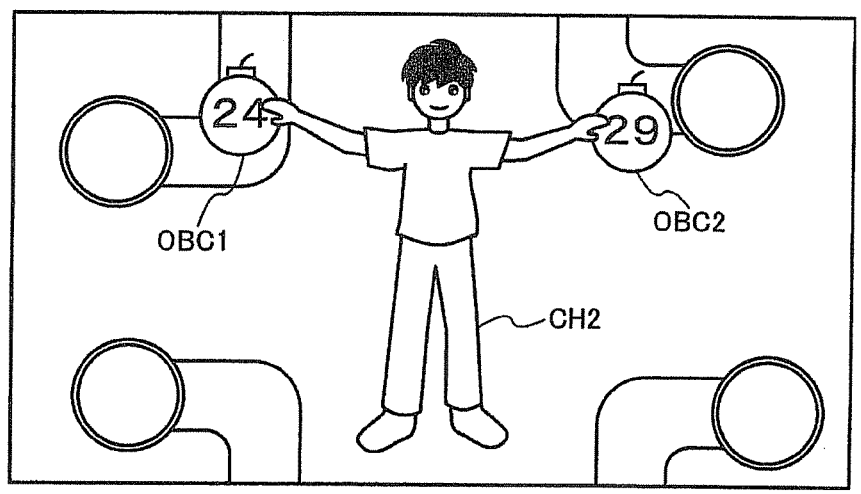

CH1 in FIGS. 11A and 11B indicates a character used as an avatar of an adult, and CH2 in FIGS. 12A and 12B indicates a character used as an avatar of a child.

In the game shown in FIGS. 11A and 11B, when the operator has moved the hands, the character CH1 moves the hands based on the motion of the hands of the operator. The operator enjoys the game by moving the hands so that the hands of the character CH1 quickly come in contact with contact target objects OBC1 and OBC2 that are displayed on the screen and imitate a bomb or the like.

The operator can cause the hands of the adult character CH1 (see FIGS. 11A and 11B) to come in contact with the contact target objects OBC1 and OBC2 by fully moving the hands outward (spreading the arms).

However, the operator cannot cause the hands of the child character CH2 (see FIG. 12A) to come in contact with the contact target objects OBC1 and OBC2 even if the operator fully moves the hands outward (spreads the arms). Specifically, the operator cannot implement a contact motion with the contact target objects OBC1 and OBC2 (see FIGS. 11A and 11B) when using the child character CH2 based on the original model data (i.e., the operator cannot play the game using this child character CH2).

In one embodiment of the invention, a correction process that changes the size of the character CH2 is performed, as shown in FIG. 12B. Specifically, the size of the character CH2 is changed by a scaling factor based on the positional relationship (e.g., distance or placement position) between the character CH2 and the contact target objects OBC1 and OBC2 that are contact targets of the character CH2. This means that the size of the original model data about the character CH2 is changed. For example, the size of the character CH2 is increased by a large scaling factor (enlargement factor) when the distance between a part (e.g., hand) of the character CH2 and the contact target objects OBC1 and OBC2 is long. On the other hand, the size of the character CH2 is increased by a small scaling factor (enlargement factor) when the distance between a part (e.g., hand) of the character CH2 and the contact target objects OBC1 and OBC2 is short.

Therefore, the hands of the child character CH2 come in contact with the contact target objects OBC1 and OBC2 (see FIG. 12B). This makes it possible for the operator to play the game without any problem even when the operator has selected the character CH2 with a small physique. When a change in size of the character is unnecessary, it is possible to implement appropriate (natural) game play that matches the character by utilizing the character having a size based on the original model data without performing the correction process that changes the size of the character.

Note that the body shape and the like of the operator may be determined based on the skeleton information shown in FIG. 3, and the character used by the operator may be automatically selected based on the determination result, for example. When it has been determined that the operator is an adult based on the analysis result for the skeleton information, for example, an adult character as shown in FIGS. 11A and 11B is automatically selected as the character used as an avatar of the operator. When it has been determined that the operator is a child, a child character as shown in FIGS. 12A and 12B is automatically selected as the character used as an avatar of the operator.

When the character has been automatically selected based on the skeleton information, the correction process that changes the size of the automatically selected character based on the positional relationship between the character and the contact target object (hit target object or play target object) is also performed. This makes it possible for the operator to play the game without any problem using the automatically selected character.

In one embodiment of the invention, a correction process that adjusts the placement position of the character based on the positional relationship between the contact target object and the character may also be performed.

FIG. 13A shows a game in which the operator guides (moves) an object OBD that imitates a car to a road in a color corresponding to the object OBD using the body of a character CH2. In this case, the size of the character CH2 is changed by a scaling factor based on the positional relationship between the character CH2 and contact target objects OBE1, OBE2, OBE3, OBE4, OBE5, and OBE6.

However, the height of the object OBE2 (see B1 in FIG. 13A) does not coincide with the height of the shoulder of the character CH2 (see B2 in FIG. 13A) when merely changing the size of the character CH2, for example.

Figure 13B:
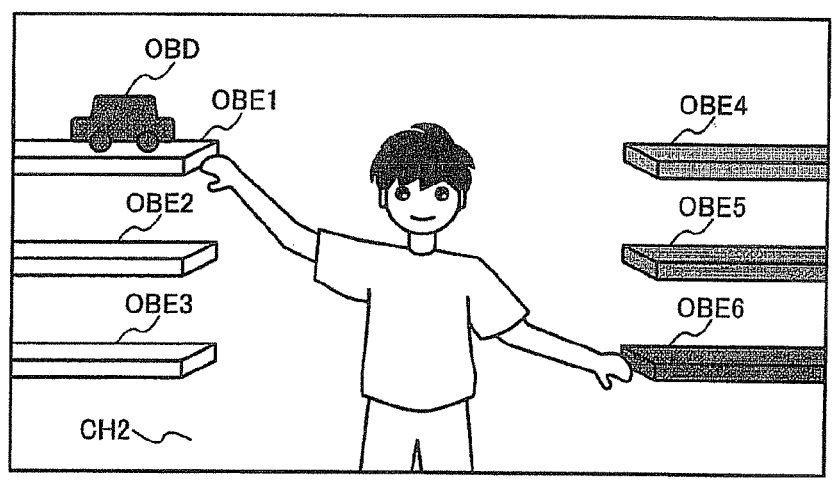

In FIG. 13B, the placement position (i.e., the position where the character is disposed) of the character CH2 is also adjusted while changing the size of the character CH2. For example, the placement position of the character CH2 is moved (adjusted) in the vertical direction (upward or downward) so that the height of the shoulder of the character CH2 coincides with the height of the object OBE2. This makes it possible for the operator to guide (move) the car object OBD to the road object OBE6 in a color corresponding to the car object OBD through the hands and the shoulders of the character CH2. This makes it possible to implement a smooth game even when using various characters.

2.4 Reliability Information

Reliability information about the skeleton information, and an image generation method based on the reliability information are described below.

The motion of the operator can be specified in real time by utilizing the skeleton information shown in FIG. 3, so that a novel operation interface environment can be implemented.

However, the operator make various motions, and each operator has a different body shape/physique. Moreover, the operator may be positioned outside the imaging range of the image sensor ISE. Accordingly, it is difficult to acquire skeleton information with a reliability of 100%. In order to deal with this problem, when it is impossible to completely track each bone (part) of the skeleton of the operator, the position (joint position) of the bone is presumed, and reliability (i.e., reliability of presumption) is linked to the position of the bone obtained by presumption, for example.

FIG. 14A shows an example of the data structure of the skeleton information. The skeleton information shown in FIG. 14A includes position information linked to each bone (joint). The position information about each bone (joint) refers to three-dimensional coordinate information in the camera coordinate system of the image sensor ISE, for example. Each bone (joint) is linked to each part of the operator. For example, bones C0, C1, and C2 are linked to the waist, the chest, and the neck, respectively. Each bone (joint) may be linked to each part using the bone number (joint number) or the like.

FIG. 14B shows an example of the data structure of the reliability information. As shown in FIG. 14B, the reliability information includes reliability that is linked to each bone (joint) of the skeleton indicated by the skeleton information. The reliability indicates the reliability of information about each bone. Specifically, the skeleton information includes the position information about each bone linked to each part of the operator (see FIG. 14A), and the reliability information shown in FIG. 14B includes the reliability of the relationship between each part and each bone (joint) of the operator, the reliability of the position information about each bone (joint) of the operator, and the like. Note that the terms "bone" and "joint" may be used interchangeably taking account of the relationship between the bones and the joints.

Figure 15A:
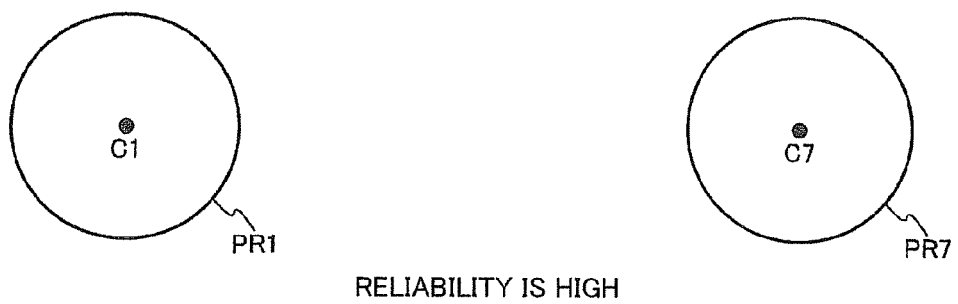
FIGS. 15A and 15B are views illustrative of reliability and an existence probability range.

In FIG. 15A, the joints C1 and C7 are positioned at a long distance. Note that PR1 and PR7 indicate existence probability ranges of the joints C1 and C7. For example, when the joints C1 and C7 are located at positions shown in FIG. 15A at one measurement timing, it is expected that the joints C1 and C7 are positioned within the existence probability ranges PR1 and PR7 at the next measurement timing. The above existence probability concept is used when presuming the skeleton information by the tracking the bone. When the joints C1 and C7 are positioned at a long distance as shown in FIG. 15A, the information (i.e., the relationship with the part and the position information) about the joints C1 and C7 has high reliability since the existence probability ranges PR1 and PR7 do not overlap.

Figure 15B:
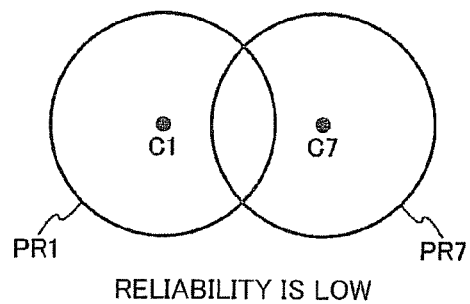

In FIG. 15B, the joints C1 and C7 are positioned at a short distance, and the existence probability ranges PR1 and PR7 overlap. In this case, the joint C1 may be determined to be joint C7 (or the joint C7 may be determined to be joint C7) at the next measurement timing. Therefore, erroneous determination may be made when presuming the skeleton information by the tracking the bone. Accordingly, the information (i.e., the relationship with the part and the position information) about the joints C1 and C7 has low reliability as compared with the case shown in FIG. 15A.

Figure 16A:
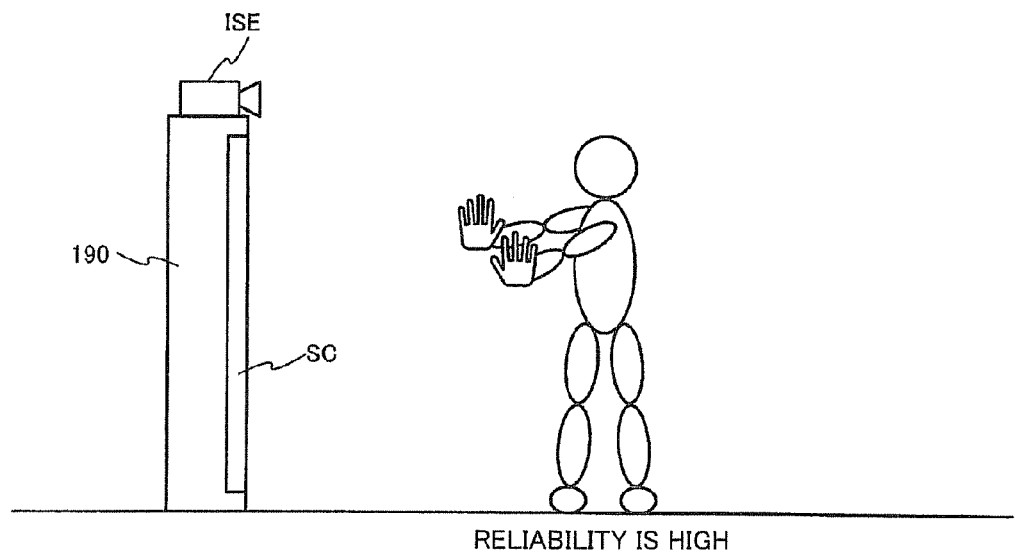
FIGS. 16A and 16B are views illustrative of reliability.

In FIG. 16A, the operator is positioned at an appropriate distance from the image sensor ISE. Therefore, the image information (e.g., resolution) obtained by the image sensor ISE has high reliability, and the skeleton information obtained based on the image information also has high reliability.

Figure 16B:
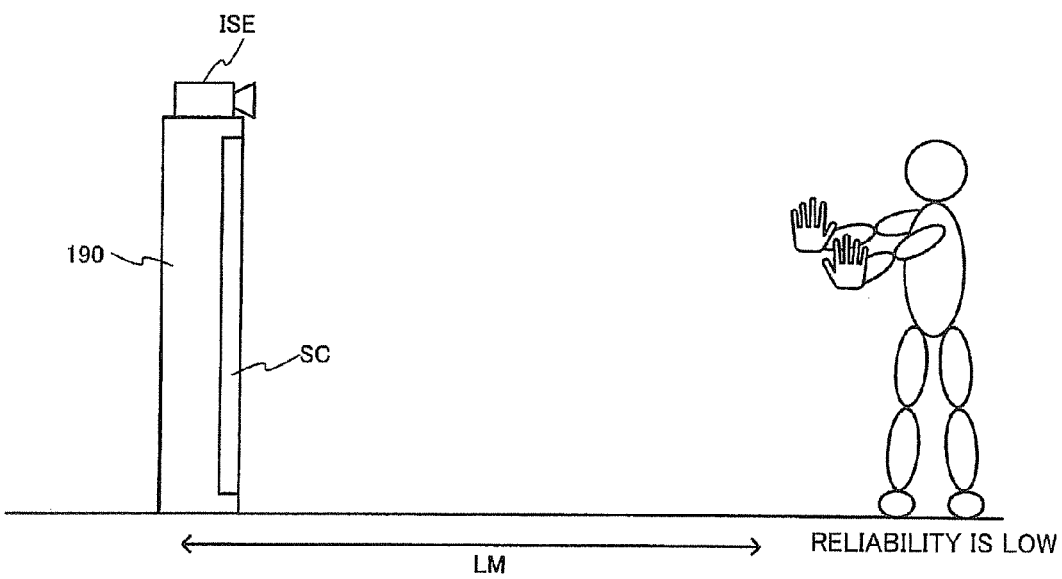

In FIG. 16B, the operator is positioned at a distance equal to or greater than a given distance (allowable distance) LM from the image sensor ISE. Therefore, the image information obtained by the image sensor ISE has low reliability, and the skeleton information obtained based on the image information also has low reliability.

As described above, the reliability information used in connection with one embodiment of the invention indicates lower reliability as a given part (e.g., hand or foot) of the operator approaches another part (e.g., chest, waist, head, or the other hand or foot) (see FIGS. 15A and 15B). The reliability information indicates low reliability when the operator is positioned at a distance equal to or greater than the given distance LM (e.g., 4 to 5 m) from the image sensor ISE (see FIGS. 16A and 16B). Note that the reliability information is not limited thereto. For example, the reliability information may be configured so that the recognition accuracy of the operator decreases when another person has approached recognition, so that the reliability of the skeleton information about the operator decreases.

In one embodiment of the invention, an image is generated using the above reliability information, and displayed on the display section 190. Specifically, the display state of the image displayed on the display section 190 is changed based on the reliability information, or the object control process or the game calculation process is performed based on the reliability information, and an image generated based on the result of the object control process or the game calculation process is displayed on the display section 190.

Figure 17A:
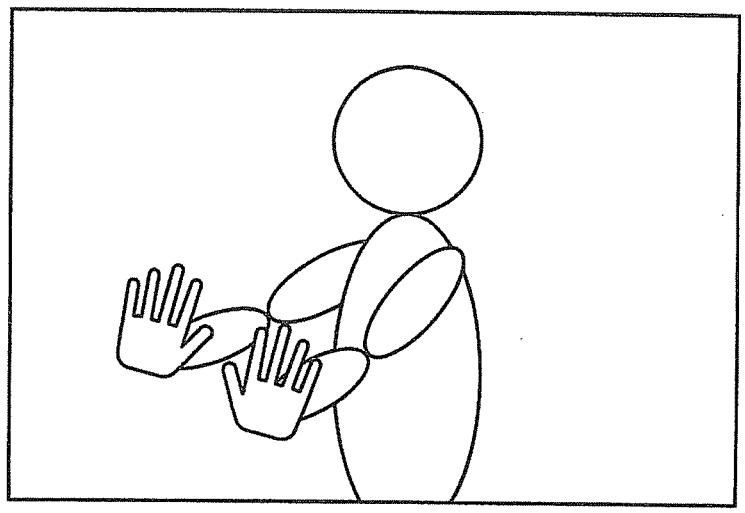
FIGS. 17A and 17B are views showing an operation motion made by an operator.
Figure 17B:
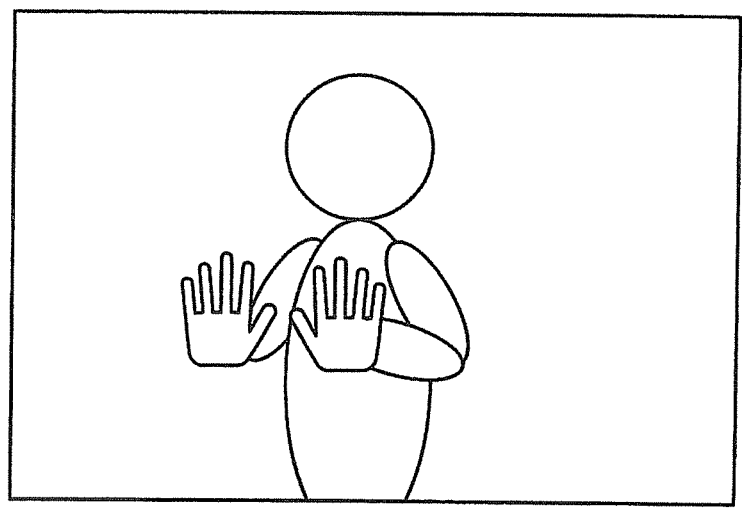

FIGS. 17A and 17B are views showing a state in which the operator stands in front of the display section 190 (see FIG. 2A), and inputs the operation information by making a body motion. In FIG. 17A, the operator inputs the operation information by moving the hands (arms) in a state in which the hands are positioned at a distance from the trunk. In FIG. 17B, the operator inputs the operation information by moving the hands (arms) in a state in which the hands are positioned close to the trunk.

In FIG. 17A, since the joint of the hand is positioned away from the joint of the chest (shoulder) as shown in FIG. 15A, the reliability of the information about the joint of the hand is high. Therefore, the position information about the hand or the like has high reliability. In FIG. 17B, since the joint of the hand is positioned close to the joint of the chest (shoulder), the reliability of the information about the joint of the hand is low. Therefore, the position information about the hand or the like has low reliability as compared with FIG. 17A. Specifically, the position information about the chest may be erroneously determined to be the position information about the hand.

When the operator has input the operation information in a state shown in FIG. 17B instead of a state shown in FIG. 17A, the system may erroneously recognize the operation of the operator. Specifically, the operation recognized by the system may not coincide with the intended operation of the operator.

Figure 18A:
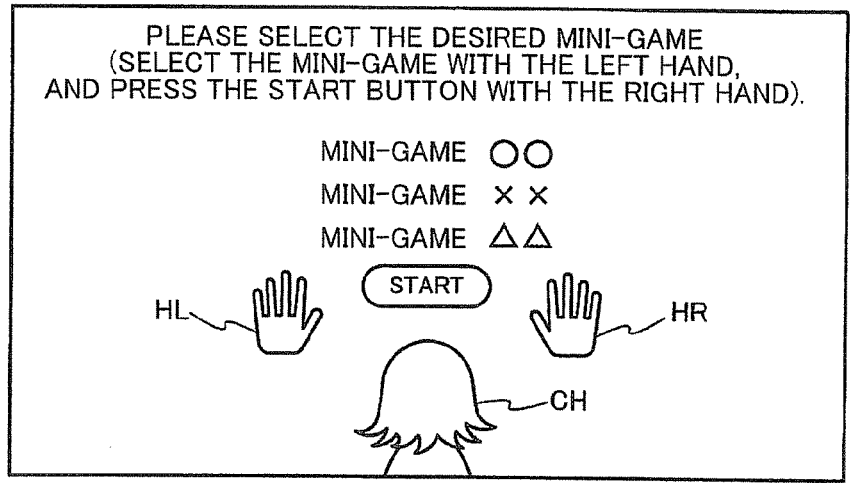
FIGS. 18A and 18B are views illustrative of a method that changes a display state of an image based on reliability information.
Figure 18B:
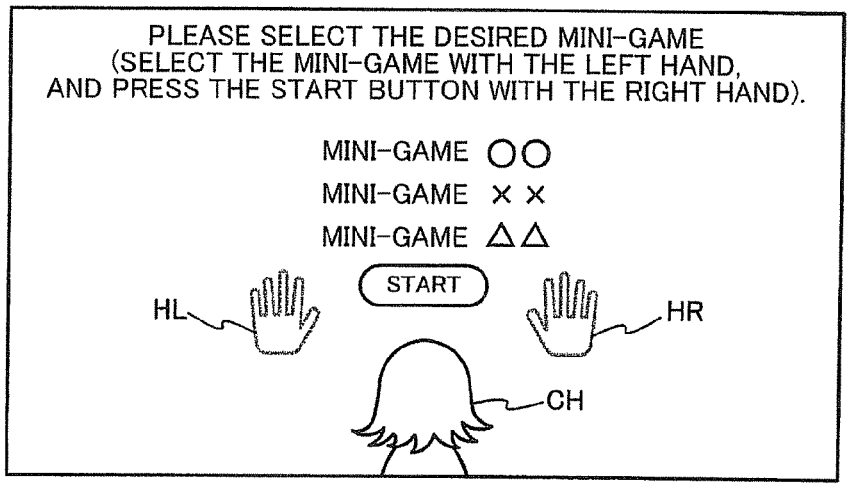

In one embodiment of the invention, the display state of an image is changed based on the reliability information as shown in FIGS. 18A and 18B in order to notify the operator that the operation state is not appropriate (see FIG. 17B).

In FIG. 18A, HR and HL indicate hand objects (icon or cursor) displayed on the display section 190 corresponding to the hands (given parts in a broad sense) of the operator. CH indicates an object of a character (avatar) corresponding to the operator.

When the operator has moved the hands as shown in FIG. 17A, the hand objects HR and HL shown in FIG. 18A move (or make a motion) based on the movement (motion) of the hands of the operator. For example, when the operator has moved the right hand around, the right hand object HR moves on the screen in the same manner as the right hand of the operator. When the operator has moved the left hand around, the left hand object HL moves on the screen in the same manner as the left hand of the operator. The operator selects a desired mini-game, or selects "START", by thus moving the hand objects HR and HL.

FIG. 18A shows an example of an image displayed when the hands are positioned away from the trunk (see FIG. 17A), and FIG. 18B shows an example of an image displayed when the hands are positioned close to the trunk (see FIG. 17B).

When the reliability of the skeleton information is considered to be high (see FIG. 17A), the hand objects HR and HL are clearly displayed (see FIG. 18A). When the reliability of the skeleton information is considered to be low (see FIG. 17B), the hand objects HR and HL are blurred, or displayed almost transparently (see FIG. 18B). Alternatively, the color of the hand objects HR and HL is changed to a pale color or the like.

Specifically, the hand objects HR and HL (objects in a broad sense) corresponding to the hands (given parts) are blurred, displayed almost transparently, or changed in color as the reliability of the information about the bone of the hand of the operator (i.e., the reliability of the information about the bone corresponding to a given part) decreases.

The hand objects HR and HL may be blurred by applying blur filtering or the like to the hand objects HR and HL. Specifically, the hand objects HR and HL may be blurred by utilizing a linear texture filtering method (i.e., a blur process using biliner filtering), box filter sampling (i.e., a multi-texture blur process that uses a plurality of textures at the same time), or the like. The hand objects HR and HL may be displayed almost transparently by changing the α-value of the hand objects HR and HL to an α-value that indicates an almost transparent state. The hand objects HR and HL may be changed in color by changing the color of the hand objects HR and HL to a color close to the target color.

Note that the display state of the hand objects HR and HL may be changed by another method. For example, the brightness (luminance) of the hand objects HR and HL may be changed, or the display state of the contour of the hand objects HR and HL may be changed, or the size of the hand objects HR and HL may be changed, or an effect applied to the hand object HR and HL may be changed as the reliability of the skeleton information decreases. For example, the brightness of the hand objects HR and HL may be decreased, or the depth or the width of the contour of the hand objects HR and HL may be decreased, or the size of the hand objects HR and HL may be increased or decreased as the reliability of the skeleton information decreases. Alternatively, an visual effect similar to that obtained by the above process may be implemented by utilizing an effect applied to the hand objects HR and HL. Alternatively, the hand objects HR and HL may be deformed based on the reliability of the skeleton information. The display state (e.g., the degree of blurring, transparency, or color) of the image of the character CH (avatar) shown in FIGS. 18A and 18B may be changed based on the reliability of the skeleton information. An icon object that indicates a decrease in reliability may be displayed when the reliability of the skeleton information has decreased.

It is possible to easily notify the operator of a decrease in reliability of the hand operation by thus changing the display state of the hand objects HR and HL based on the reliability. For example, when the hands are positioned close to the trunk (see FIG. 17B), the hand objects HR and HL are blurred as shown in FIG. 18B. The operator who has observed the display state of the hand objects HR and HL stretches the arms as shown in FIG. 17A. Therefore, the operator inputs the operation information by moving the hands in a state in which the reliability of the skeleton information is high (FIG. 17A), so that a situation in which the operation of the operator is erroneously recognized can be prevented. This makes it possible to provide the operator with a comfortable operation interface environment that prevents an erroneous operation and the like.

An example in which the method according to one embodiment of the invention is applied to the game device has been mainly described above. Note that the method according to one embodiment of the invention may also be applied to various instruments other than the game device.

Figure 19A:
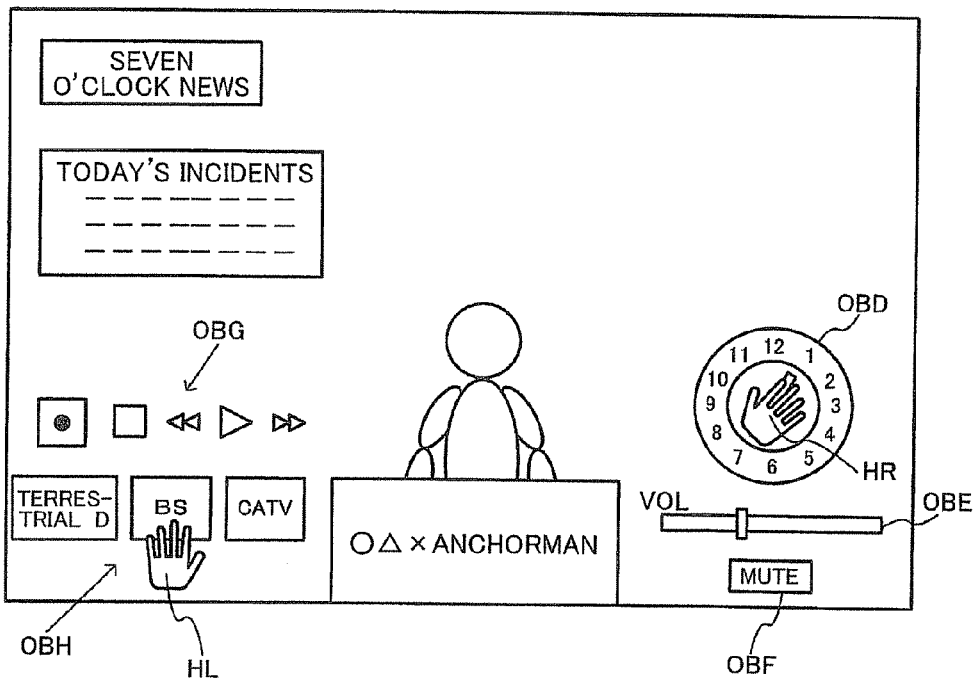
FIGS. 19A and 19B are views illustrative of an example in which a method according to one embodiment of the invention is applied to a visual instrument.

FIG. 19A shows an example in which the method according to one embodiment of the invention is applied to a television set (display device) (i.e., visual instrument). In FIG. 19A, operation target objects OBD, OBE, OBF, OBG, and OBH are operation target objects of the operator. For example, the operation target objects OBD, OBE, OBF, OBG, and OBH are used to issue an operation instruction to the visual instrument (or game device). Specifically, the operation target objects OBD, OBE, OBF, OBG, and OBH are used to issue at least one of a content selection instruction, a given instrument operation instruction, and a content play/record instruction. For example, the operation target objects OBD, OBE, and OBF are operation target objects for channel selection (content selection in a broad sense), a volume operation (instrument operation selection in a broad sense), and a mute operation (instrument operation selection in a broad sense), respectively. The operation target objects OBG and OH are operation target objects for a content play/record operation (e.g., play, stop, fast-forward, rewind, or record) and a broadcasting type selection operation (e.g., terrestrial digital broadcasting or satellite broadcasting), respectively.

When the operator desires to change the channel, the operator stretches the arm toward the display section 190, and moves the hand object HR to the position of the operation target object OBD for a channel operation. The operator then changes the channel by moving (rotating) the hand, and watches the desired broadcast program.

When the operator desires to adjust the volume, the operator stretches the arm toward the display section 190, and moves the hand object HR to the position of the operation target object OBE for a volume operation. The operator then adjusts the volume by moving the hand to the right or left. When the operator desires to mute the sound, the operator stretches the arm toward the display section 190, and moves the hand object HR to the position of the operation target object OBF for a mute operation. The operator then performs a press operation or the like to mute the sound. The operation target objects OBG and OBH may be operated in the same manner as described above.

When the reliability of the skeleton information is high (e.g., the operator stretches the arms without crossing the right hand and the left hand), the operation target objects OBD to OBH and the hand objects HR and HL are clearly displayed on the display section 190, as shown in FIG. 19A.

When the reliability of the skeleton information is high, the operator can operate the operation target objects OBD to OBH by moving the hands or the like. Specifically, the operator can operate the operation target object OBD for a channel operation or the operation target object OBE for a volume operation by rotating the hand or moving the hand to the right or left.

Figure 19B:
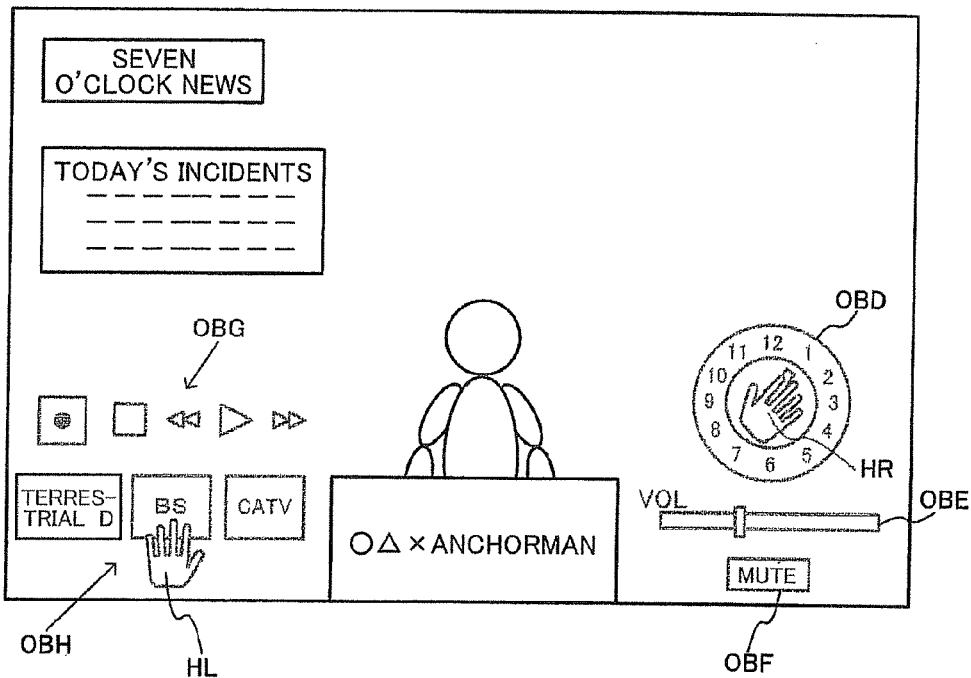

When the reliability of the skeleton information is low (e.g., the hands of the operator are positioned close to the trunk, or the operator crosses the arms), the operation target objects OBD to OBH and the hand objects HR and HL are blurred or displayed (almost) transparently, as shown in FIG. 19B. Specifically, the display state of the operation target objects OBD to OBH and the hand objects HR and HL is changed based on the reliability information. When the reliability is low, the operation target objects OBD to OBH are blurred or displayed almost transparently.

When the reliability is low, the operation of the operator on the operation target objects OBD to OBH is limited or prohibited. Specifically, the operator cannot operate the operation target object OBD for a channel operation or the operation target object OBE for a volume operation even if the operator rotates the hand or moves the hand to the right or left.

According to the above configuration, the operation target objects OBD to OBH are displayed on the screen (see FIG. 19A) when the operator has stretched the arms, for example, and the operator can perform a content (image or sound) selection operation, an instrument operation, or a content play/record operation by operating the operation target objects OBD to OBH.

When the operator has bent the arms at a position close to the trunk, the operation target objects OBD to OBH are blurred or displayed transparently (see FIG. 19B). Therefore, the operation target objects OBD to OBH are hardly observed on the screen, and the operator can enjoy watching the content (e.g., picture) without being disturbed.

According to one embodiment of the invention, when the reliability of the skeleton information is low, the operation of the operator on the operation target objects OBD to OBH is limited or prohibited. When the reliability of the skeleton information is high, the operation of the operator on the operation target objects OBD to OBH is allowed. This makes it possible to provide the operator with a novel operation interface environment.

When implementing an operation interface environment as shown in FIGS. 19A and 19B, the interface environment may be inconvenient to the operator if the moving range of the hand objects HR and HL differs between a case where the operator is an adult and a case where the operator is a child.

According to one embodiment of the invention, since the correction process described with reference to FIGS. 4A to 8B and the like is performed, the moving range of the hand objects HR and HL can be set to an identical wide range irrespective of the individual operator. This makes it possible to provide the operator with a convenient interface environment, so that convenience to the operator can be improved.

2.5 Specific Processing Example

Figure 20:
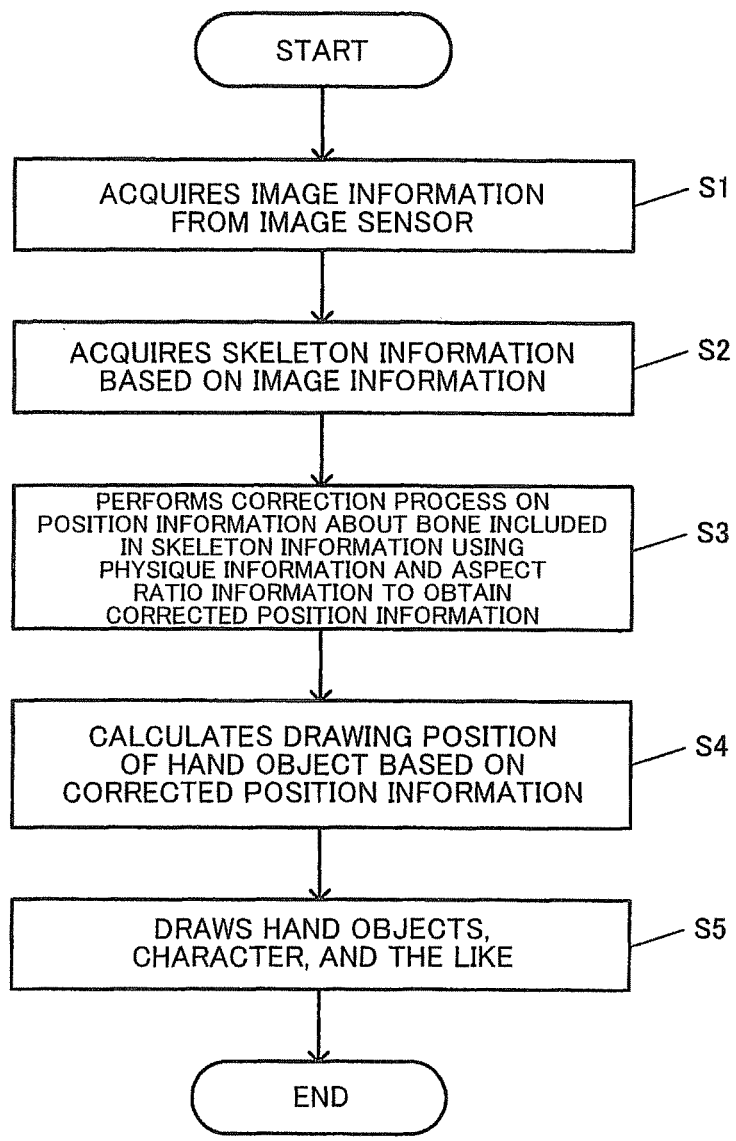
FIG. 20 is a flowchart illustrative of a process according to one embodiment of the invention.

A specific processing example according to one embodiment of the invention is described below using flowcharts shown in FIGS. 20 and 21. FIG. 20 is a flowchart showing a specific example of the process that performs the correction process on the skeleton information, and generates an image.

The image information is acquired from the image sensor, as described with reference to FIGS. 2A and 2B (step S1). The skeleton information is then acquired based on the image information, as described with reference to FIG. 3 (step S2).

The correction process is then performed on the position information about the bone included in the skeleton information using the physique information and the aspect ratio information to obtain the corrected position information, as described with reference to FIGS. 4A to 8B, for example (step S3). The drawing position of the hand object is then calculated based on the corrected position information (step S4), and the hand objects, the character, and the like are drawn (step S5).

Figure 21:
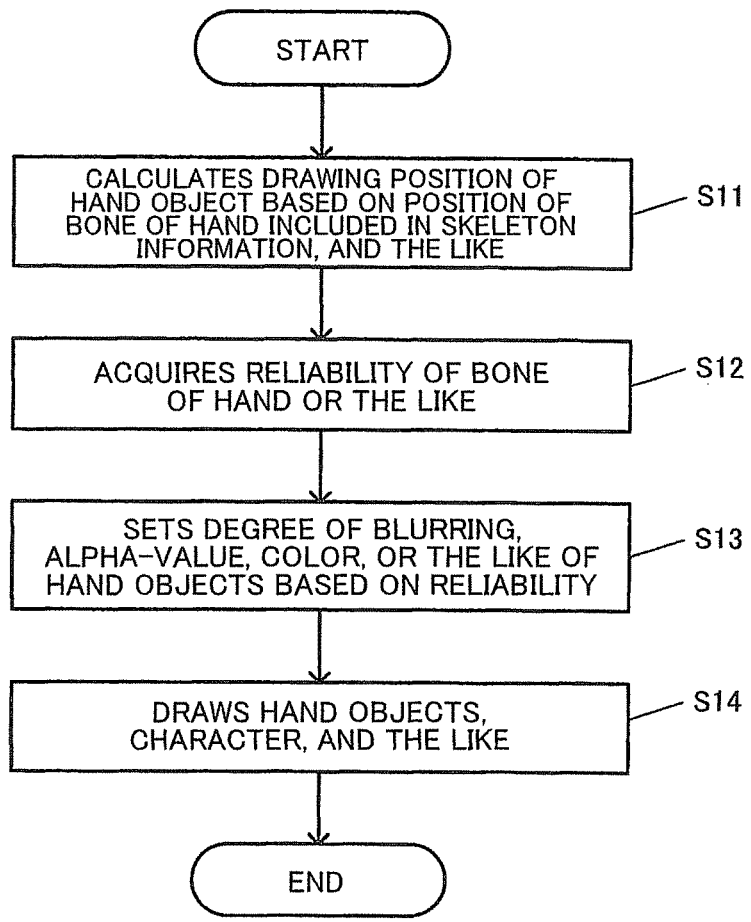
FIG. 21 is a flowchart illustrative of a process according to one embodiment of the invention.

FIG. 21 is a flowchart showing a specific example of the process that changes the display state of an image using the reliability information.

The drawing position of the hand object is calculated based on the position of the bone (joint) of the hand included in the skeleton information, and the like (step S11). The reliability of the bone of the hand or the like is then acquired (step S12).

The degree of blurring, the α-value, the color, or the like of the hand objects is set based on the acquired reliability (step S13). The hand objects, the character, and the like for which the degree of blurring, the α-value, the color, or the like has been set, are then drawn (step S14). The display state of the image can thus be changed as shown in FIGS. 18A and 18B.

Although some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g., skeleton information, hand, or hand object) cited with a different term (e.g., motion information, given part, or object) having a broader meaning or the same meaning at least once in the specification and the drawings may be replaced by the different term in any place in the specification and the drawings. The skeleton information acquisition method, the skeleton information correction method, the object control method, the game calculation method, the reliability information acquisition method, the method of changing the display state of an image, and the like are not limited to those described in connection with the above embodiments. Methods equivalent to the above methods are intended to be included within the scope of the invention. The invention may be applied to various games. The invention may be applied to various image generation systems such as an arcade game system, a consumer game system, a large-scale attraction system in which a number of players participate, a simulator, a multimedia terminal, a system board that generates a game image, a mobile phone, a visual instrument, an audio instrument, and a home electric appliance.

What is claimed is:

1. An image generation system comprising:
    an image information acquisition section that acquires image information from an image sensor;
    a skeleton information acquisition section that acquires skeleton information based on the image information from the image sensor, the skeleton information specifying a motion of an operator viewed from the image sensor;
    a correction section that performs a correction process on position information about a bone of a skeleton indicated by the skeleton information, the correction section performing the correction process using physique information about the operator in a first mode;
    an image generation section that generates an image corresponding to a result of the correction process; and
    an object control section that controls an object that moves or makes a motion based on a motion of the operator, the object control section being configured to selectively control the object in the first mode by using the result of the correction process and in a second mode without using the result of the correction process,
    wherein:
        in the first mode, the object is controlled so that a position or moving amount of the object is identical when a first operator and a second operator have made a similar motion, the first operator having a first physique and the second operator having a second physique, the first physique being smaller than the second physique, and
        in the second mode, the object is controlled so that the position or the moving amount of the object is not identical when the first operator and the second operator have made the similar motion.

2. The image generation system as defined in claim 1,
    the correction section performing the correction process on the position information about the bone of the skeleton to obtain corrected position information;
    the object control section controlling the object based on the corrected position information; and
    the image generation section generating an image so that the object is displayed at a display position on a screen corresponding to the corrected position information.

3. The image generation system as defined in claim 1,
    the object being an object that moves based on a motion of a given part of the operator.

4. The image generation system as defined in claim 3,
    the given part being a hand of the operator, and the object being a hand object that moves based on a motion of the hand of the operator.

5. The image generation system as defined in claim 1,
    the correction section performing the correction process so that a display position of the object when a skeleton of a first operator is in a first state is identical with a display position of the object when a skeleton of a second operator is in the first state.

6. The image generation system as defined in claim 1, further comprising:
    a game calculation section that performs a game calculation process,
    the game calculation section performing the game calculation process corresponding to the result of the correction process.

7. The image generation system as defined in claim 6,
    the game calculation section performing a game result calculation process corresponding to the result of the correction process as the game calculation process.

8. The image generation system as defined in claim 7,
    the correction section performing the correction process on moving amount information about a position of the bone of the skeleton to obtain corrected moving amount information; and
    the game calculation section performing the game result calculation process based on the corrected moving amount information.

9. The image generation system as defined in claim 1, further comprising:
    an object control section that controls an object of a character that moves or makes a motion based on a motion of the operator,
    the correction section performing the correction process that changes a size of the character by a scaling factor based on a positional relationship between the character and a contact target object that is a contact target of the character.

10. The image generation system as defined in claim 9,
    the correction section performing the correction process that adjusts a placement position of the character based on the positional relationship between the contact target object and the character.

11. The image generation system as defined in claim 1, further comprising:
    a reliability information acquisition section that acquires reliability information that indicates reliability of the skeleton information,
    the image generation section generating an image corresponding to the acquired reliability information as the image displayed on the display section.

12. The image generation system as defined in claim 11,
    the image generation section changing a display state of the image displayed on the display section based on the reliability information.

13. An image generation method comprising;
    acquiring image information from an image sensor;
    acquiring skeleton information based on the image information from the image sensor, the skeleton information specifying a motion of an operator viewed from the image sensor;
    performing a correction process on position information about a bone of a skeleton indicated by the skeleton information, the correction process is performed using physique information about the operator in a first mode;
    generating an image corresponding to a result of the correction process; and
    controlling an object that moves or makes a motion based on a motion of the operator, the object control section being configured to selectively control the object in the first mode by using the result of the correction process and in a second mode without using the result of the correction process,
    wherein:
    in the first mode, the object is controlled so that a position or moving amount of the object is identical when a first operator and a second operator have made a similar motion, the first operator having a first physique and the second operator having a second physique, the first physique being smaller than the second physique, and
    in the second mode, the object is controlled so that the position or the moving amount of the object is not identical when the first operator and the second operator have made the similar motion.

14. A non-transitory computer-readable information storage medium storing a program that causes a computer to execute steps comprising:
acquiring image information from an image sensor;
acquiring skeleton information based on the image information from the image sensor, the skeleton information specifying a motion of an operator viewed from the image sensor;
performing a correction process on position information about a bone of a skeleton indicated by the skeleton information, the correction process is performed using physique information about the operator in a first mode;
generating an image corresponding to a result of the correction process; and
controlling an object that moves or makes a motion based on a motion of the operator, the object control section being configured to selectively control the object in the first mode by using the result of the correction process and in a second mode without using the result of the correction process,
wherein:
in the first mode, the object is controlled so that a position or moving amount of the object is identical when a first operator and a second operator have made a similar motion, the first operator having a first physique and the second operator having a second physique, the first physique being smaller than the second physique, and
in the second mode, the object is controlled so that the position or the moving amount of the object is not identical when the first operator and the second operator have made the similar motion.

15. The image generation system as defined in claim 1, wherein the correction section corrects position information about a distal bone of a skeleton indicated by the skeleton information so as to extend a reach of the character.

16. The image generation method as defined in claim 13, wherein the correction section corrects position information about a distal bone of a skeleton indicated by the skeleton information so as to extend a reach of the character.

* * * * *